US012701037B2

(12) United States Patent
Fang et al.

(10) Patent No.: US 12,701,037 B2
(45) Date of Patent: Aug. 4, 2026

(54) APPARATUS, SYSTEM, AND METHOD OF COMMUNICATING AN EXTENDED RANGE (ER) PHYSICAL LAYER (PHY) PROTOCOL DATA UNIT (PPDU)

(71) Applicant: INTEL CORPORATION, Santa Clara, CA (US)

(72) Inventors: Juan Fang, Portland, OR (US); Qinghua Li, San Ramon, CA (US); Po-Kai Huang, San Jose, CA (US); Thomas J. Kenney, Portland, OR (US); Robert Stacey, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/956,866

(22) Filed: Sep. 30, 2022

(65) Prior Publication Data

US 2023/0023324 A1     Jan. 26, 2023

(51) Int. Cl.
H04L 27/26          (2006.01)
H04L 5/00          (2006.01)
(52) U.S. Cl.
CPC ........ H04L 27/2613 (2013.01); H04L 5/0007 (2013.01); H04L 5/0044 (2013.01)
(58) Field of Classification Search
CPC ............. H04L 27/2602; H04L 27/2603; H04L 5/0023; H04L 1/00; H04L 27/26; H04L 5/0094; H04L 5/0007; H04L 5/0048; H04L 5/0041; H04L 1/0003; H04L 27/2605; H04L 1/0042; H04L 69/323;

H04W 84/12; H04W 72/23; H04W 74/08; H04W 28/06; H04W 72/0453; H04W 74/00; H04W 52/0229; H04W 74/002; H04W 74/0808;

(Continued)

(56) References Cited

U.S. PATENT DOCUMENTS

| | | | | |
|---|---|---|---|---|
| 11,843,973 | B2 * | 12/2023 | Tsujimaru | ........... H04L 27/2602 |
| 12,445,902 | B2 * | 10/2025 | Fujimori | .............. H04W 28/06 |

(Continued)

OTHER PUBLICATIONS

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, IEEE Std 802.11™-2020 (Revision of IEEE Std 802.11-2016), Approved Dec. 3, 2020, 4379 pages.

(Continued)

*Primary Examiner* — Eva Y Puente
(74) *Attorney, Agent, or Firm* — Shichrur & Co.

(57) ABSTRACT

For example, a wireless communication device may be configured to generate, transmit, receive and/or process one or more transmissions of an Extra Range (ER) Physical layer (PHY) Protocol Data Unit (PPDU), which may be configured to be decodable by ER wireless communication stations (STAs). For example, the ER PPDU may include an ER preamble. For example, the ER preamble may be configured to include an ER STF (ER-STF), an ER LTF (ER-LTF) after the ER-STF, and an ER Signal (ER-SIG) field after the ER-LTF. In one example, the ER PPDU may include a non-ER preamble, which may be configured to be decodable by non-ER STAs, which may not be capable of decoding the ER preamble.

20 Claims, 11 Drawing Sheets

(58) Field of Classification Search
CPC ... H04W 28/065; H04W 16/14; H04W 28/18;
H04B 7/0452; H04B 7/028; H04B
7/0417; H04B 7/0413; H04B 7/0617;
H04B 7/06952; H04B 7/0817; H04B
7/086; H04B 7/088
See application file for complete search history.

(56) References Cited

U.S. PATENT DOCUMENTS

| | | | |
|---|---|---|---|
| 12,446,072 B2 * | 10/2025 | Wang | H04W 74/0816 |
| 2018/0184365 A1 | 6/2018 | Gidvani et al. | |
| 2022/0045889 A1 * | 2/2022 | Yu | H04W 72/0453 |
| 2023/0087449 A1 | 3/2023 | Li et al. | |
| 2023/0114857 A1 | 4/2023 | Lou et al. | |
| 2023/0133677 A1 | 5/2023 | Sun et al. | |
| 2023/0148403 A1 | 5/2023 | Fang et al. | |
| 2023/0163808 A1 | 5/2023 | Lou et al. | |
| 2023/0319886 A1 | 10/2023 | Wang et al. | |
| 2023/0362994 A1 | 11/2023 | Wang et al. | |
| 2024/0015059 A1 * | 1/2024 | Balakrishnan | H04L 27/2085 |

| | | | |
|---|---|---|---|
| 2024/0072924 A1 | 2/2024 | Chu et al. | |
| 2024/0147531 A1 | 5/2024 | Ryu et al. | |
| 2025/0184980 A1 | 6/2025 | Soma | |

OTHER PUBLICATIONS

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, Amendment 1: Enhancements for High-Efficiency WLAN, IEEE Std 802.11ax™-2021 (Amendment to IEEE Std 802.11-2020), Approved Feb. 9, 2021, 767 Pages.

IEEE P802.11be™/D2.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT), IEEE, May 2022, 873 pages.

Office Action for U.S. Appl. No. 18/071,811, mailed on Mar. 9, 2026, 23 pages.

* cited by examiner

Figure 8:
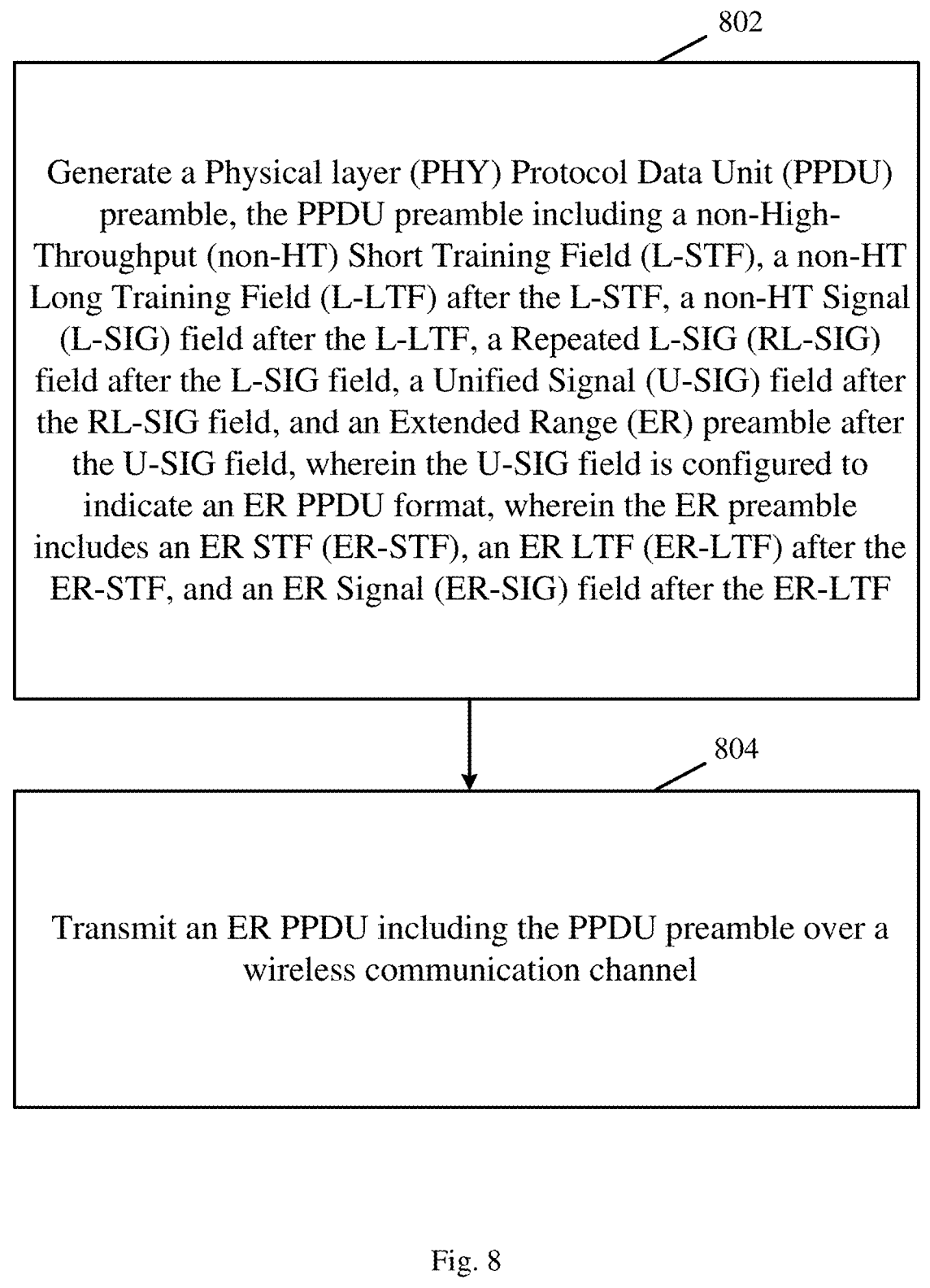

802

Generate a Physical layer (PHY) Protocol Data Unit (PPDU) preamble, the PPDU preamble including a non-High-Throughput (non-HT) Short Training Field (L-STF), a non-HT Long Training Field (L-LTF) after the L-STF, a non-HT Signal (L-SIG) field after the L-LTF, a Repeated L-SIG (RL-SIG) field after the L-SIG field, a Unified Signal (U-SIG) field after the RL-SIG field, and an Extended Range (ER) preamble after the U-SIG field, wherein the U-SIG field is configured to indicate an ER PPDU format, wherein the ER preamble includes an ER STF (ER-STF), an ER LTF (ER-LTF) after the ER-STF, and an ER Signal (ER-SIG) field after the ER-LTF

804

Transmit an ER PPDU including the PPDU preamble over a wireless communication channel

Figure 9:
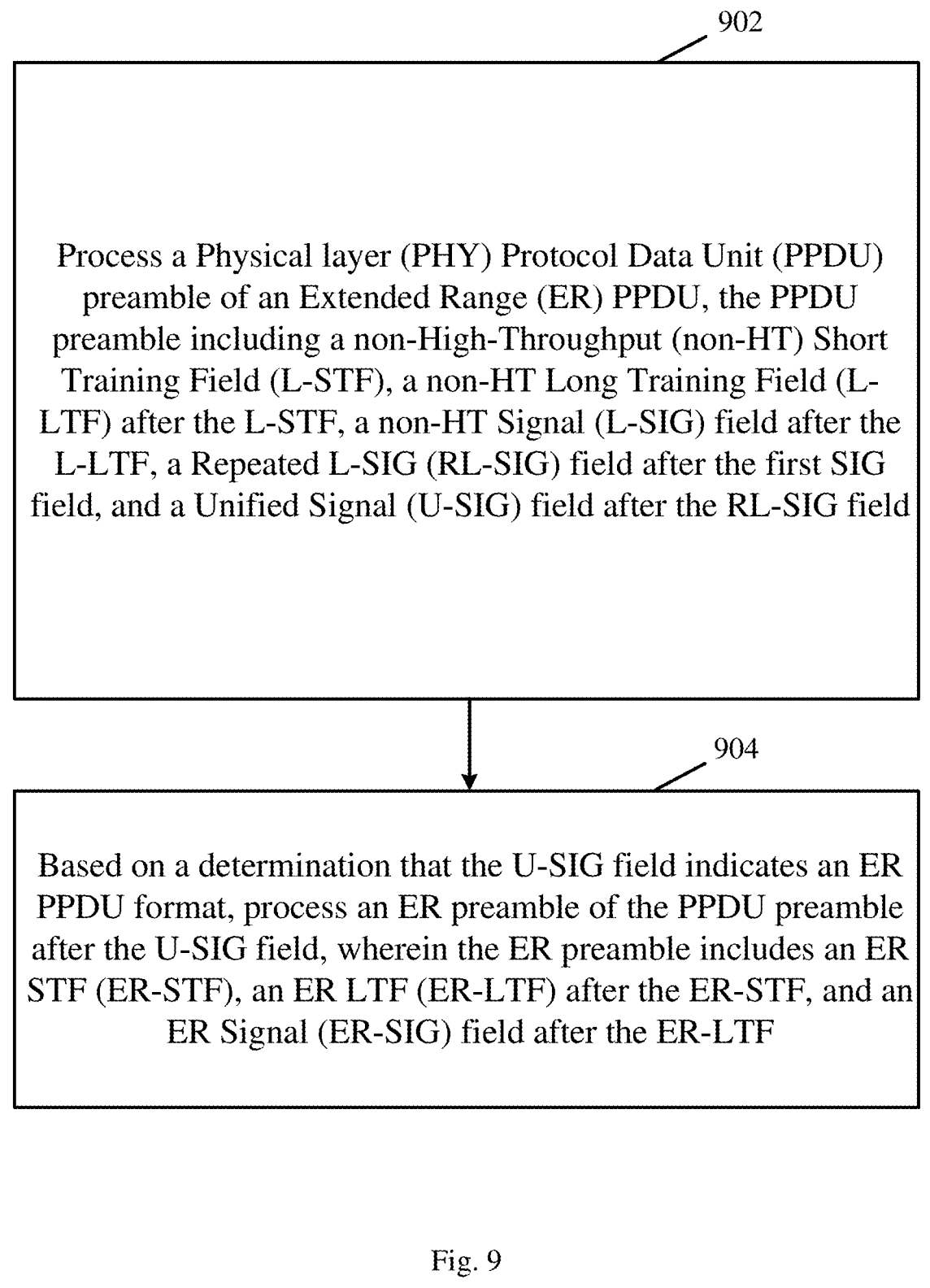

Process a Physical layer (PHY) Protocol Data Unit (PPDU) preamble of an Extended Range (ER) PPDU, the PPDU preamble including a non-High-Throughput (non-HT) Short Training Field (L-STF), a non-HT Long Training Field (L-LTF) after the L-STF, a non-HT Signal (L-SIG) field after the L-LTF, a Repeated L-SIG (RL-SIG) field after the first SIG field, and a Unified Signal (U-SIG) field after the RL-SIG field

904

Based on a determination that the U-SIG field indicates an ER PPDU format, process an ER preamble of the PPDU preamble after the U-SIG field, wherein the ER preamble includes an ER STF (ER-STF), an ER LTF (ER-LTF) after the ER-STF, and an ER Signal (ER-SIG) field after the ER-LTF

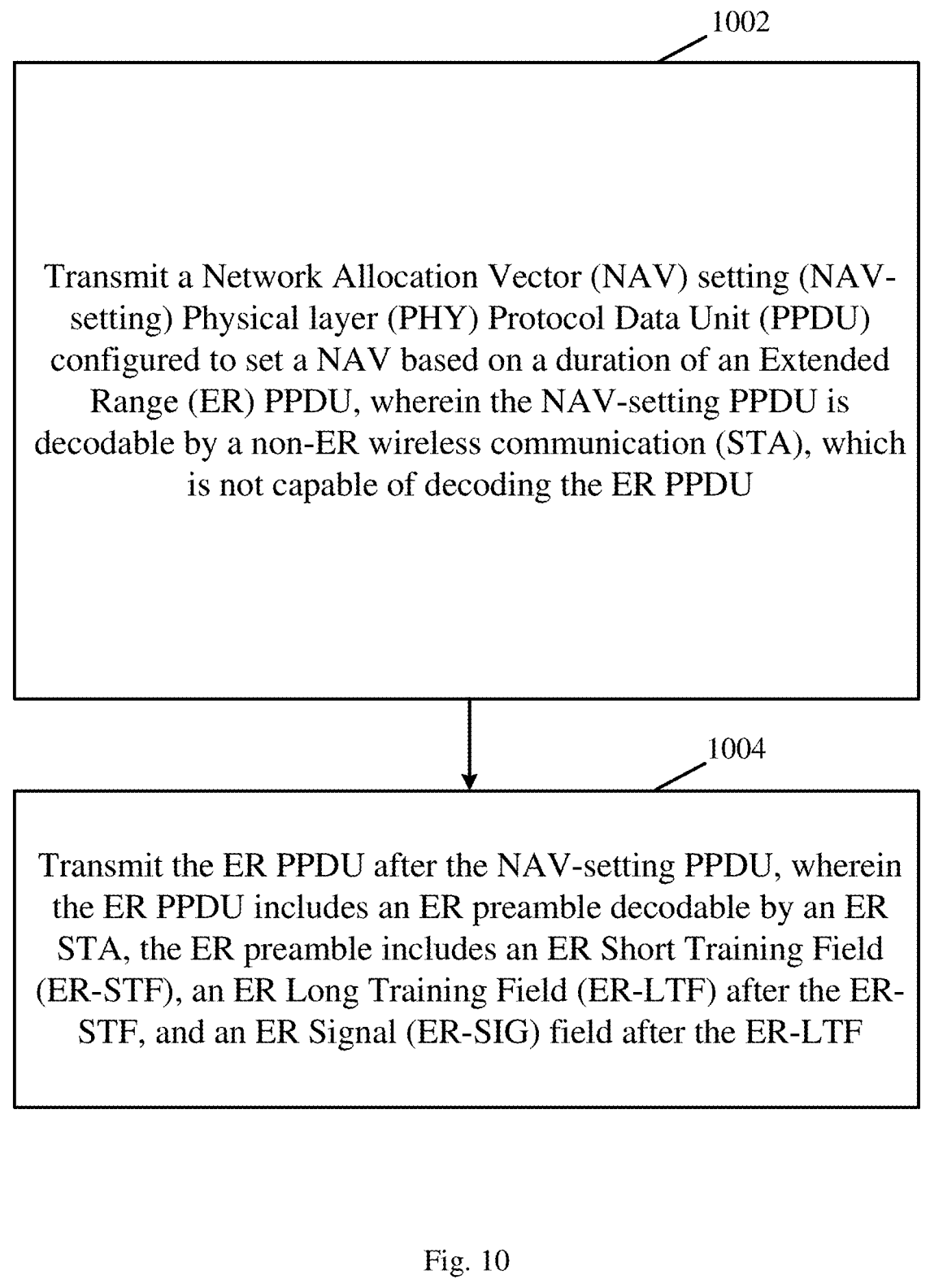

Transmit a Network Allocation Vector (NAV) setting (NAV-setting) Physical layer (PHY) Protocol Data Unit (PPDU) configured to set a NAV based on a duration of an Extended Range (ER) PPDU, wherein the NAV-setting PPDU is decodable by a non-ER wireless communication (STA), which is not capable of decoding the ER PPDU

1004

Transmit the ER PPDU after the NAV-setting PPDU, wherein the ER PPDU includes an ER preamble decodable by an ER STA, the ER preamble includes an ER Short Training Field (ER-STF), an ER Long Training Field (ER-LTF) after the ER-STF, and an ER Signal (ER-SIG) field after the ER-LTF

Fig. 10

APPARATUS, SYSTEM, AND METHOD OF COMMUNICATING AN EXTENDED RANGE (ER) PHYSICAL LAYER (PHY) PROTOCOL DATA UNIT (PPDU)

TECHNICAL FIELD

Aspects described herein generally relate to communicating an Extended Range (ER) Physical layer (PHY) Protocol Data Unit (PPDU).

BACKGROUND

Some wireless communication devices may be configured to long range communications, e.g., according to an IEEE 802.11 Specification.

There is a need for techniques to support long range wireless communication with improved performance.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 8 is a schematic flow-chart illustration of a method of communicating an ER PPDU, in accordance with some demonstrative aspects.

FIG. 9 is a schematic flow-chart illustration of a method of communicating an ER PPDU, in accordance with some demonstrative aspects.

FIG. 10 is a schematic flow-chart illustration of a method of communicating an ER PPDU, in accordance with some demonstrative aspects.

DETAILED DESCRIPTION

Figure 1:
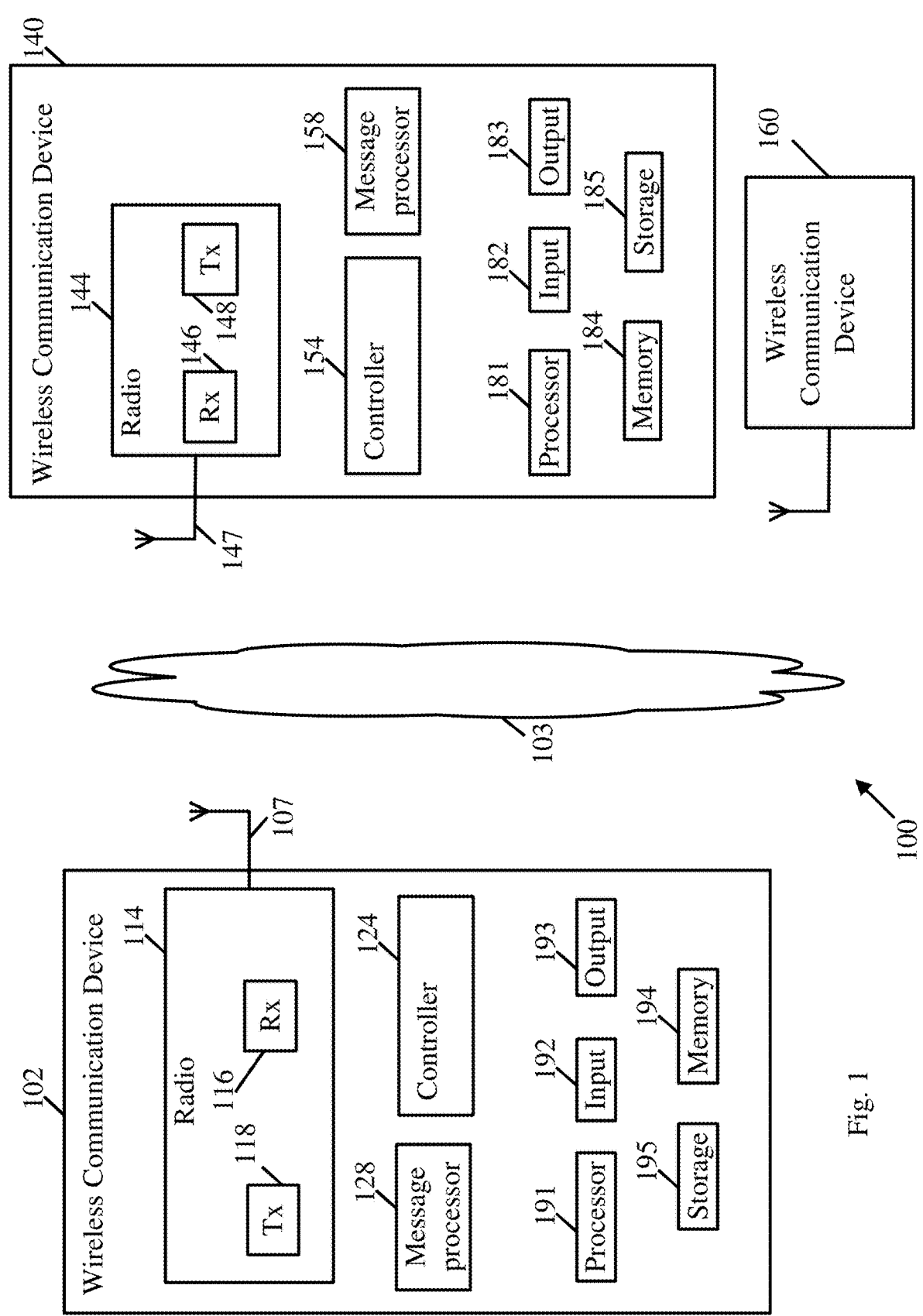
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (*IEEE 802.11-2020, IEEE Standard for Information Technology— Telecommunications and Information Exchange between Systems Local and Metropolitan Area Networks—Specific Requirements; Part 11: Wireless LAN Medium Access Control (MAC) and Physical Layer (PHY) Specifications,* December, 2020); IEEE 802.11ax (*IEEE P802.11ax-2021, IEEE Standard for Information Technology—Telecommunications and Information Exchange between Systems Local and Metropolitan Area Networks—Specific Requirements; Part 11: Wireless LAN Medium Access Control (MAC) and Physical Layer (PHY) Specifications; Amendment 1: Enhancements for High-Efficiency WLAN,* February, 2021); and/or IEEE 802.11be (*IEEE P802.11be/D2.0 Draft Standard for Information technology—Telecommunications and information exchange between systems Local and metro-* politan area networks—Specific requirements; Part 11: *Wireless LAN Medium Access Control (MAC) and Physical Layer (PHY) Specifications; Amendment 8: Enhancements for extremely high throughput (EHT)*, May 2022)) and/or future versions and/or derivatives thereof, devices and/or networks operating in accordance with existing cellular specifications and/or protocols, and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared. Dedicated, or group), that execute one or more software or firmware programs, a combinational logic circuit, and/or other suitable hardware components that provide the described functionality. In some aspects, some functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a sub-10 Gigahertz (GHz) frequency band, for example, a 2.4 GHz frequency band, a 5 GHz frequency band, a 6 GHz frequency band, and/or any other frequency band below 10 GHz.

Some demonstrative aspects may be used in conjunction with a wireless communication network communicating over an Extremely High Frequency (EHF) band (also referred to as the "millimeter wave (mmWave)" frequency band), for example, a frequency band within the frequency band of between 20 Ghz and 300 GHz, for example, a frequency band above 45 GHz, e.g., a 60 GHz frequency band, and/or any other mmWave frequency band.

Some demonstrative aspects may be used in conjunction with a wireless communication network communicating over the sub-10 GHz frequency band and/or the mmWave frequency band, e.g., as described below. However, other aspects may be implemented utilizing any other suitable wireless communication frequency bands, for example, a 5G frequency band, a frequency band below 20 GHz, a Sub 1 GHz (S1G) band, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Some demonstrative aspects may be implemented by an Extremely High Throughput (EHT) STA, which may include for example, a STA having a radio transmitter, which is capable of operating on a channel that is in frequency bands between 1 GHz and 7.250 Ghz. The EHT STA may perform other additional or alternative functionality. Other aspects may be implemented by any other apparatus, device and/or station.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, a wireless communication device 160, and/or one more other devices.

In some demonstrative aspects, devices 102, 140, and/or 160 may include a mobile device or a non-mobile, e.g., a static, device.

For example, devices 102, 140, and/or 160 may include, for example, a UE, an MD, a STA, an AP, a Smartphone, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a video source, an audio source, a video sink, an audio sink, a stereo tuner, a broadcast radio receiver, a digital audio player, a speaker, an audio receiver, an audio amplifier, a gaming device, a data source, a data sink, a media player, a television, a music player, a smart device such as, for example, lamps, climate control, car components, household components, appliances, and the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an OS of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a disk drive, a solid-state drive (SSD), and/or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102, 140, and/or 160 may be capable of communicating content, data, information and/or signals via a wireless medium (WM) 103. In some demonstrative aspects, wireless medium 103 may include, for example, a radio channel, a cellular channel, an RF channel, a Wi-Fi channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a sub-10 Ghz wireless communication frequency band, for example, one or more channels in a 2.4 GHz wireless communication frequency band, one or more channels in a 5 GHz wireless communication frequency band, and/or one or more channels in a 6 GHz wireless communication frequency band. For example, WM 103 may additionally or alternatively include one or more channels in a mmWave wireless communication frequency band. In other aspects, WM 103 may include any other type of channel over any other frequency band.

In some demonstrative aspects, device 102, device 140, and/or device 160 may include one or more radios including circuitry and/or logic to perform wireless communication between devices 102, 140, 160, and/or one or more other wireless communication devices. For example, device 102 may include at least one radio 114, and/or device 140 may include at least one radio 144.

In some demonstrative aspects, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative aspects, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative aspects, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative aspects, radios 114 and/or 144 may be configured to communicate over a 2.4 GHz band, a 5 GHz band, a 6 GHz band, a mmWave band, and/or any other band, for example, a 5G band, an S1G band, and/or any other band.

In some demonstrative aspects, radios 114 and/or 144 may include, or may be associated with one or more, e.g., a plurality of, antennas.

In some demonstrative aspects, device 102 may include one or more, e.g., a single antenna or a plurality of, antennas 107, and/or device 140 may include on or more, e.g., a plurality of, antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a single antenna, a plurality of antennas, a phased array antenna, a multiple element antenna, a set of switched beam antennas, and/or the like. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, antennas 107 and/or antennas 147 may be connected to, and/or associated with, one or more Radio Frequency (RF) chains.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 160 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other aspects, controller 124, message processor 128 and/or radio 114 may be implemented by one or more additional or alternative elements of device 102.

In some demonstrative aspects, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other aspects, controller 154, message processor 158 and/or radio 144 may be implemented by one or more additional or alternative elements of device 140.

In some demonstrative aspects, device 102, device 140, and/or device 160 may include, operate as, perform the role of, and/or perform one or more functionalities of, one or more STAs. For example, device 102 may include at least one STA, device 140 may include at least one STA, and/or device 160 may include at least one STA.

In some demonstrative aspects, device 102, device 140, and/or device 160 may include, operate as, perform the role of, and/or perform one or more functionalities of, one or more EHT STAs. For example, device 102 may include, operate as, perform the role of, and/or perform one or more functionalities of, at least one EHT STA; device 140 may include, operate as, perform the role of, and/or perform one or more functionalities of, at least one EHT STA; and/or device 160 may include, operate as, perform the role of, and/or perform one or more functionalities of, at least one EHT STA.

In other aspects, devices 102, 140 and/or 160 may include, operate as, perform the role of, and/or perform one or more functionalities of, any other wireless device and/or station, e.g., a WLAN STA, a Wi-Fi STA, and the like.

In some demonstrative aspects, device 102, device 140, and/or device 160 may be configured operate as, perform the role of, and/or perform one or more functionalities of, an access point (AP), e.g., an EHT AP, or any other AP.

In some demonstrative aspects, device 102, device 140, and/or device 160 may be configured to operate as, perform the role of, and/or perform one or more functionalities of, a non-AP STA, e.g., an EHT non-AP STA, pr any other non-AP STA.

In other aspects, device 102, device 140, and/or device 160 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In some demonstrative aspects devices 102, 140 and/or 160 may be configured to communicate over an EHT network, and/or any other network. For example, devices 102, 140 and/or 160 may perform Multiple-Input-Multiple-Output (MIMO) communication, for example, for communicating over the EHT networks, e.g., over an EHT frequency band, e.g., in frequency bands between 1 GHz and 7.250 GHz.

In some demonstrative aspects, devices 102, 140 and/or 160 may be configured to operate in accordance with one or more Specifications, for example, including one or more IEEE 802.11 Specifications, e.g., an IEEE 802.11-2020 Specification, an IEEE 802.11be Specification, and/or any other specification and/or protocol.

In some demonstrative aspects, devices 102, 140 and/or 160 may be configured according to one or more standards, for example, in accordance with an IEEE 802.11ax Standard, an IEEE 802.11az Standard, and/or an IEEE 802.11be Standard, which may be configured, for example, to enhance the efficiency and/or performance of an IEEE 802.11 Specification, which may be configured to provide Wi-Fi connectivity.

Some demonstrative aspects may enable, for example, to significantly increase the data throughput defined in the IEEE 802.11-2020 Specification, for example, up to a throughput of 30 Giga bits per second (Gbps), or to any other throughput, which may, for example, satisfy growing demand in network capacity for new coming applications.

Some demonstrative aspects may be implemented, for example, to support increasing a transmission data rate, for example, by applying MIMO and/or Orthogonal Frequency Division Multiple Access (OFDMA) techniques.

In some demonstrative aspects, devices 102, 140 and/or 160 may be configured to communicate MIMO communications and/or OFDMA communication in frequency bands between 1 GHz and 7.250 GHz.

In some demonstrative aspects, device 102, device 140 and/or device 160 may be configured to support one or more mechanisms and/or features, for example, OFDMA, Single User (SU) MIMO, and/or Multi-User (MU) MIMO, for example, in accordance with an IEEE 802.11be Standard and/or any other standard and/or protocol.

In some demonstrative aspects, device 102, device 140 and/or device 160 may include, operate as, perform a role of, and/or perform the functionality of, one or more EHT STAs. For example, device 102 may include, operate as, perform a role of, and/or perform the functionality of, at least one EHT STA, device 140 may include, operate as, perform a role of, and/or perform the functionality of, at least one EHT STA, and/or device 160 may include, operate as, perform a role of, and/or perform the functionality of, at least one EHT STA.

In some demonstrative aspects, devices 102, 140 and/or 160 may implement a communication scheme, which may include Physical layer (PHY) and/or Media Access Control (MAC) layer schemes, for example, to support one or more applications, and/or increased throughput, e.g., throughputs up to 30 Gbps, or any other throughput.

In some demonstrative aspects, the PHY and/or MAC layer schemes may be configured to support OFDMA techniques, SU MIMO techniques, and/or MU MIMO techniques.

In some demonstrative aspects, devices 102, 140 and/or 160 may be configured to implement one or more mechanisms, which may be configured to enable SU and/or MU communication of Downlink (DL) and/or Uplink frames (UL) using a MIMO scheme.

In some demonstrative aspects, device 102, device 140 and/or device 160 may be configured to implement one or more MU communication mechanisms. For example, devices 102, 140 and/or 160 may be configured to implement one or more MU mechanisms, which may be configured to enable MU communication of DL frames using a MIMO scheme, for example, between a device, e.g., device 102, and a plurality of devices, e.g., including device 140, device 160, and/or one or more other devices.

In some demonstrative aspects, devices 102, 140, and/or 160 may be configured to communicate over an EHT network, and/or any other network and/or any other frequency band. For example, devices 102, 140, and/or 160 may be configured to communicate DL transmissions and/or UL transmissions, for example, for communicating over the EHT networks.

In some demonstrative aspects, devices 102, 140 and/or 160 may be configured to communicate over a channel bandwidth, e.g., of at least 20 Megahertz (MHz), in frequency bands between 1 GHz and 7.250 GHz.

In some demonstrative aspects, devices 102, 140 and/or 160 may be configured to implement one or more mechanisms, which may, for example, support communication over a wide channel bandwidth (BW) ("channel width") (also referred to as a "wide channel" or "wide BW") covering two or more channels, e.g., two or more 20 MHz channels, e.g., as described below.

In some demonstrative aspects, wide channel mechanisms may include, for example, a mechanism and/or an operation whereby two or more channels, e.g., 20 MHz channels, can be combined, aggregated or bonded, e.g., for a higher bandwidth of packet transmission, for example, to enable achieving higher throughputs, e.g., when compared to transmissions over a single channel. Some demonstrative aspects are described herein with respect to communication over a channel BW including two or more 20 MHz channels, however other aspects may be implemented with respect to communications over a channel bandwidth, e.g., a "wide" channel, including or formed by any other number of two or more channels, for example, a bonded or aggregated channel including a bonding or an aggregation of two or more channels.

In some demonstrative aspects, device 102, device 140 and/or device 160 may be configured to communicate one or more transmissions over one or more channel BWs, for example, including a channel BW of 20 MHz, a channel BW of 40 MHz, a channel BW of 80 MHz, a channel BW of 160 MHz, a channel BW of 320 MHz, and/or any other additional or alternative channel BW.

In other aspects, any other additional or alternative channel width may be utilized.

In other aspects, for example, devices 102, 140 and/or 160 may be configured to perform one or more operations, and/or functionalities of a WiFi 8 STA.

In some demonstrative aspects, for example, devices 102, 140 and/or 160 may be configured to perform one or more operations, and/or functionalities of an Ultra High Reliability (UHR) STA.

In other aspects, for example, devices 102, 140 and/or 160 may be configured to perform one or more operations, and/or functionalities of any other additional or alternative type of STA.

In some demonstrative aspects, device 102, device 140 and/or device 160 may be configured to implement one or more Extended Range (ER) communication techniques to support extended range communications, e.g., as described below.

In some demonstrative aspects, the ER communication techniques may be configured to provide a technical solution to support ER wireless communication with improved performance, for example, compared to communication techniques according to one or more standards, e.g., as described below.

In one example, long range communications may be implemented in WLAN according to techniques of an IEEE 802.11b Standard. However, these techniques may suffer from a weak channel coding, and may suffer for coexistence issues, e.g., with some mainstream OFDM-based systems.

For example, the techniques of the IEEE 802.11b Standard may be replaced, for example, by an OFDM-based system, for example, with similar range coverage. For example, a performance provided by the OFDM-based system may be about 9 dB better than a performance supported by a 20 MHz Modulation and Coding Scheme (MCS) 0 of an OFDM-based 6 Mbps mode, e.g., of an IEEE 802.11a Standard.

In another example, a High Efficiency (HE) ER SU PPDU format, e.g., in accordance with an IEEE 802.11ax Specification, may be configured to boost both a Short Training Field (STF) and a Long Training Field (LTF), for example, with 3 dB, and to repeat both an HE Signal (SIG) A1 (HE-SIG-A1) field and an HE SIG A2 (HE-SIG-A2) field twice, e.g., to form a sequence HE-SIG-A1, HE-SIG-A1-R, HE-SIG-A2 and HE-SIG-A2-R fields. For example, the HE-SIG-A1-R field may be modulated with Quadrature Binary Phase-Shift Keying (QBPSK), for example, to indicate an extended range mode. For example, HE ER SU PPDU may supports only a single 242-tone or 106-tone Resource Unit (RU) for a data portion. For example, an HE ER SU PPDU with a 242-tone RU may be transmitted with only the MCS0, 1 and 2 and with a single spatial stream. For example, an HE ER SU PPDU with a 106-tone RU may be transmitted with only the MCS0 with single spatial stream, and a 106-tone RU allocation within a 20 MHz tone plan may be fixed as the one that is higher in the frequency.

In another example, an ER preamble may be defined, e.g., in accordance with an IEEE 802.11be Specification. For example, both the STF and the LTF may be boosted with 3 dB, and both a first Unified Signal (U-SIG) (U-SIG1) field and a second U-SIG (U-SIG2) may be repeated twice, for example, to improve performance. For example, a first repetition of the first U-SIG field (U-SIG-sym-1-R) may be transmitted with QBPSK, which may be used to indicate the extended range mode. However, there is no ER data format defined in accordance with the IEEE 802.11be Specification.

In another example, an Extremely High Throughput (EHT) EHT MCS 14 may be configured, e.g., in accordance with the IEEE 802.11be Specification, as a Duplicate (DUP) mode for a single user transmission with single spatial stream and Low Density Parity Check (LDPC) coding in a 6 GHz band. However, this mode may only be defined and used in the case while the channel bandwidth is equal to 80 MHz, 160 MHz or 320 Mhz.

In some demonstrative aspects, there may be a need to provide a technical solution to address one or more technical issues of these ER definitions described above.

For example, the ER definitions described above may only achieve up to 3 dB performance gain, e.g., and actual improved performance may only be about 1.5 dB, which may not be high enough, for example, to achieve symmetric performance between an uplink direction and a downlink direction.

In some demonstrative aspects, device 102, device 140 and/or device 160 may be configured to generate, transmit, receive and/or process one or more transmissions utilizing an ER preamble (also referred to as "new ER preamble"), e.g., as described below.

In some demonstrative aspects, the new ER preamble may be configured to provide a technical solution to achieve improved performance, for example, to support extended range applications, e.g., as described below.

In some demonstrative aspects, the new ER preamble may be configured to provide a technical solution to achieve improved performance, for example, an improvement of about 6 or 9 dB, e.g., better than an 20 MHz MCS 0 of an OFDM-based scheme, e.g., of an IEEE 802.11a Standard.

In some demonstrative aspects, the new ER preamble may be configured to provide a technical solution to support backward capability with devices operating according to one or more existing PHY designs and/or modes, e.g., according to one or more existing IEEE 802.11 Specifications.

In some demonstrative aspects, device 102, device 140 and/or device 160 may be configured to generate, transmit, receive and/or process an ER PPDU according to an ER PPDU format including the ER preamble, e.g., as described below.

In some demonstrative aspects, the ER PPDU may be implemented in accordance with an ER mode (e.g., WiFi 8 ER), for example, in accordance with a future WiFi 8 Specification.

In some demonstrative aspects, the ER preamble may be configured according to an ER preamble structure, which may be configured to provide a technical solution to support differentiation of the ER PPDU from one or more other types of PPDUs, for example, including a non-High-Throughput (non-HT) PPDU, a High-Throughput (HT) PPDU, a Very High Throughput (VHT) PPDU, an HE PPDU, an EHT PPDU, and/or or more additional or alternative types of PPDUs, e.g., as described below.

In some demonstrative aspects, the ER preamble may be configured according to an ER preamble structure, which may be configured to provide a technical solution to support Early Termination (ET), for example, in case the ER PPDU is received by a STA (legacy STA), which is not capable of decoding and/or processing the PPDU, e.g., as described below. For example, the legacy STA may include an 11be STA, e.g., in accordance with an IEEE 802.11be Specification, an 11ax STA, e.g., in accordance with an IEEE 802.11ax Specification, an 11ac STA, e.g., in accordance with an IEEE 802.11ac Specification, an 11n STA, e.g., in accordance with an IEEE 802.11n Specification an 11a STA, e.g., in accordance with an IEEE 802.11a Specification, and/or any other legacy STA.

In some demonstrative aspects, the ER preamble may be configured according to an ER preamble structure, which may be configured to provide a technical solution to support backward compatibility with the legacy devices, e.g., as described below.

In some demonstrative aspects, the ER preamble may be configured according to an ER preamble structure, which may be configured to provide a technical solution to support detection, e.g., by an ER STA, for example, with relatively high reliability and/or at a relatively low Received Signal Strength Indicator (RSSI), e.g., as described below.

In some demonstrative aspects, the ER preamble may be configured according to an ER preamble structure, which may be configured to provide a technical solution to support demodulation of a data portion of the ER PPDU, for example, by an ER STA, e.g., as described below.

In some demonstrative aspects, a data payload of the ER PPDU may be modulated according to an OFDM scheme. In other aspects, the data payload of the ER PPDU may be modulated according to any other modulation scheme.

In some demonstrative aspects, device 102, device 140 and/or device 160 may be configured to generate, transmit, receive and/or process one or more transmissions of an ER PPDU, e.g., as described below.

In some demonstrative aspects, controller 124 may be configured to control, trigger, cause, and/or instruct device 102 to generate a PPDU preamble of an ER PPDU, e.g., as described below.

In some demonstrative aspects, the PPDU preamble may include a non-High-Throughput (non-HT) Short Training Field (L-STF), e.g., as described below.

In some demonstrative aspects, the PPDU preamble may include a non-HT Long Training Field (L-LTF), for example, after the L-STF, e.g., as described below.

In some demonstrative aspects, the PPDU preamble may include a non-HT Signal (L-SIG) field, for example, after the L-LTF, e.g., as described below.

In some demonstrative aspects, the PPDU preamble may include a Repeated L-SIG (RL-SIG) field, for example, after the L-SIG field, e.g., as described below.

In some demonstrative aspects, the PPDU preamble may include a Unified Signal (U-SIG) field, for example, after the RL-SIG field, e.g., as described below.

In some demonstrative aspects, the U-SIG field may be configured to indicate an ER PPDU format, e.g., as described below.

In some demonstrative aspects, the U-SIG field of the ER PPDU may include an ER field, which may be configured to indicate the ER PPDU format, e.g., as described below.

In some demonstrative aspects, the ER field may include a 1-bit field, which may be set to a value of 1, for example, to indicate the ER PPDU format, e.g., as described below.

In some demonstrative aspects, the ER field may include a 20-th bit of the U-SIG field, e.g., as described below.

In other aspects, the ER field may be implemented by any other additional or alternative bits of the U-SIG field, the ER field may be implemented by any other additional or alternative portion and/or field of the ER PPDU, and/or the ER field may be configured to be set to any other additional or alternative value to indicate the ER PPDU format.

In some demonstrative aspects, the U-SIG field of the ER PPDU may include a PHY version identifier field, which may be configured to indicate a PHY version supporting the ER PPDU, e.g., as described below.

In some demonstrative aspects, the U-SIG field of the ER PPDU may include a PHY version identifier field, which may include a bit to indicate the ER PPDU format, e.g., as described below.

In some demonstrative aspects, the U-SIG field of the ER PPDU may include a PHY version identifier field configured to indicate an Ultra High Reliability (UHR) PHY version, e.g., as described below.

In some demonstrative aspects, the U-SIG field of the ER PPDU may include a PHY version identifier field comprising a value of 1.

In some demonstrative aspects, the PPDU preamble of the ER PPDU may include a repetition of the U-SIG field, for example, with a rotated constellation, for example, to indicate the ER PPDU format, e.g., as described below.

In some demonstrative aspects, the PPDU preamble may include an ER preamble, for example, after the U-SIG field, e.g., as described below.

In some demonstrative aspects, the ER preamble may include an ER STF (ER-STF), e.g., as described below.

In some demonstrative aspects, the ER-STF may include, for example, 10 or more repetitions of an ER-STF structure, e.g., as described below.

In some demonstrative aspects, the ER-STF structure may have, for example, a duration of 0.8 microseconds.

In some demonstrative aspects, the ER-STF may include, for example, 40 or more repetitions of an ER-STF structure, e.g., as described below.

In some demonstrative aspects, the ER-STF structure may have, for example, a duration of 0.2 microseconds.

In some demonstrative aspects, the ER-STF may include, for example, 20 or more repetitions of an ER-STF structure, e.g., as described below.

In some demonstrative aspects, the ER-STF structure may have, for example, a duration of 0.4 microseconds, e.g., as described below.

In other aspects, the ER-STF may include any other count of repetitions of any other additional or alternative ER-STF structure, e.g., having any other duration.

In some demonstrative aspects, the ER preamble may include an ER LTF (ER-LTF), for example, after the ER-STF, e.g., as described below.

In some demonstrative aspects, the ER-LTF may include 3 or more Orthogonal Frequency Division Multiplexing (OFDM) symbols, e.g., as described below.

In some demonstrative aspects, the ER preamble may include an ER Signal (ER-SIG) field, for example, after the ER-LTF, e.g., as described below.

In some demonstrative aspects, the ER-SIG field may include an ER PPDU identifier, which may be configured to identify the ER PPDU format, e.g., as described below.

In some demonstrative aspects, the ER-SIG field may include at least one of a data rate field, a length field, and/or an Association Identifier (AID) field, e.g., as described below.

In some demonstrative aspects, the ER-SIG field may include any other additional or alternative fields and/or information.

In some demonstrative aspects, the ER-SIG field may include one or more version-independent fields of the U-SIG, e.g., as described below.

In some demonstrative aspects, the ER-SIG field may be encoded, for example, according to a Modulation and Coding Scheme (MCS) 14 or an MCS 15, e.g., as described below.

In some demonstrative aspects, the U-SIG field of the ER PPDU may be encoded according to a first MCS, and the ER-SIG field may be encoded according to a second MCS, which may be different from the first MCS, e.g., as described below.

In some demonstrative aspects, the U-SIG field of the ER PPDU may be configured for transmission according to a first PHY mode, and the ER-SIG field may be configured for transmission according to a second PHY mode, which may be different from the first PHY mode, e.g., as described below.

In some demonstrative aspects, the PPDU preamble of the ER PPDU may include one or more OFDM symbols, for example, between the U-SIG field and the ER preamble, e.g., as described below.

In some demonstrative aspects, the ER PPDU may include an ER data field, for example, after the PPDU preamble, e.g., as described below.

In some demonstrative aspects, controller 124 may be configured to control, trigger, cause, and/or instruct device 102 to encode the ER data field, for example, according to an MCS 0, an MCS 1, an MCS 14, an MCS 15, or an MCS greater than 15, e.g., as described below. In other aspects, any other suitable MCS may be implemented.

In some demonstrative aspects, controller 124 may be configured to control, trigger, cause, and/or instruct device 102 to transmit an ER PPDU including the PPDU preamble over a wireless communication channel.

In some demonstrative aspects, controller 154 may be configured to control, trigger, cause, and/or instruct device 140 to process a PPDU preamble of an ER PPDU, e.g., as described below.

In some demonstrative aspects, the PPDU preamble may include an L-STF, an L-LTF, e.g., after the L-STF, an L-SIG field, e.g., after the L-LTF, an RL-SIG field, e.g., after the first SIG field, and a U-SIG field after the RL-SIG field.

For example, controller 154 may be configured to control, trigger, cause, and/or instruct device 140 to process the PPDU preamble transmitted by device 102, e.g., as described above.

In some demonstrative aspects, controller 154 may be configured to control, trigger, cause, and/or instruct device 140 to process an ER preamble of the PPDU preamble after the U-SIG field, for example, based on a determination that the U-SIG field indicates an ER PPDU format.

In some demonstrative aspects, controller 154 may be configured to control, trigger, cause, and/or instruct device 140 to determine that the U-SIG field indicates the ER PPDU format, for example, based on information in the U-SIG field, e.g., as described above.

In some demonstrative aspects, controller 154 may be configured to control, trigger, cause, and/or instruct device 140 to process the ER preamble by processing an ER-STF, an ER-LTF, e.g., after the ER-STF, and an ER-SIG field, e.g., after the ER-LTF, e.g., as described below.

Figure 2:
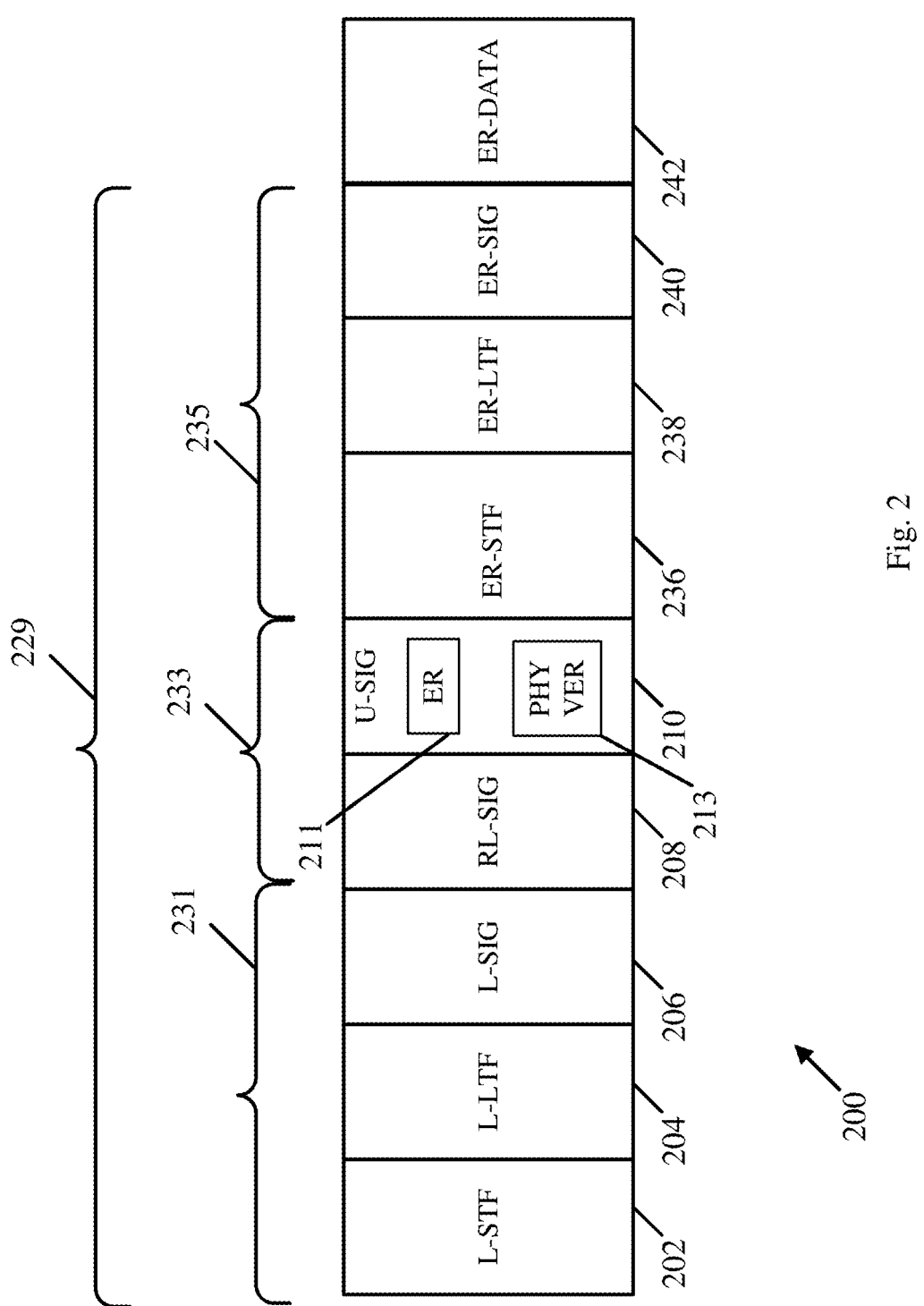
FIG. 2 is a schematic illustration of an Extended Range (ER) Physical layer (PHY) Protocol Data Unit (PPDU), in accordance with some demonstrative aspects.

Reference is made to FIG. 2, which schematically illustrates an ER PPDU format 200, which may be implemented in accordance with some demonstrative aspects. In one example, devices 102 (FIG. 1), 140 (FIG. 1), and/or 160 (FIG. 1) may be configured to generate, transmit, receive and/or process one or more ER PPDUs having the structure and/or format of ER PPDU 200.

In some demonstrative aspects, as shown in FIG. 2, ER PPDU 200 may include a non-High Throughput (non-HT) (legacy) Short Training Field (STF) (L-STF) 202, followed by a non-HT (Legacy) Long Training Field (LTF) (L-LTF) 204, which may be followed by a non-HT Signal (SIG) (L-SIG) field 206.

In some demonstrative aspects, for example, L-STF 202, L-LTF 204, and L-SIG field 206 may be configured to form a non-HT (legacy) preamble. For example, the non-HT (legacy) preamble may be decodable and/or processable by non-HT (legacy) STAs.

In some demonstrative aspects, as shown in FIG. 2, ER PPDU 200 may include a repeated non-HT SIG (RL-SIG) field 208, which may follow the L-SIG field 206. The RL-SIG field 208 may be followed by a Universal SIG (U-SIG) field 210.

In some demonstrative aspects, for example, RL-SIG field 208 may be configured as a field of non-legacy preamble, which may be decodable and/or processable by non-legacy STAs, for example, STAs implemented in accordance with an IEEE 802.11n Specification and/or later IEEE 802.11 Specifications, and/or STAs implemented in accordance with a WiFi 7 Standard and/or later WiFi Standards.

In some demonstrative aspects, for example, U-SIG field 210 may be configured as a field of an EHT preamble, which may be decodable and/or processable by EHT STAs, for example, STAs implemented in accordance with an IEEE 802.11be Specification and/or later IEEE 802.11 Specifications, and/or STAs implemented in accordance with a WiFi 7 Standard and/or later WiFi Standards.

In some demonstrative aspects, U-SIG field 210 may be configured to indicate an ER PPDU format, e.g., as described below.

In some demonstrative aspects, U-SIG field 210 may include an ER field 211, which may be configured to indicate the ER PPDU format, e.g., as described below.

In some demonstrative aspects, ER field 211 may include a 1-bit field, which may be set to a value of 1, for example, to indicate the ER PPDU format, e.g., as described below.

In some demonstrative aspects, ER field 211 may include a 20-th bit of the U-SIG field, e.g., as described below.

In other aspects, ER field 211 may be implemented by any other additional or alternative bits of the U-SIG field 210, the ER field 211 may be implemented by any other additional or alternative portion and/or field of the ER PPDU 200, and/or the ER field 211 may be configured to be set to any other additional or alternative value to indicate the ER PPDU format.

In some demonstrative aspects, U-SIG field 210 may include a PHY version identifier field 213, which may be configured to indicate a PHY version supporting the ER PPDU, e.g., as described below.

In some demonstrative aspects, PHY version identifier field 213 may include a bit to indicate the ER PPDU format, e.g., as described below.

In some demonstrative aspects, PHY version identifier field 213 may be configured to indicate a UHR PHY version, e.g., as described below.

In some demonstrative aspects, the PHY version identifier field may be configured to be set to a value of 1, for example, to indicate the PHY version supporting the ER PPDU.

In some demonstrative aspects, ER PPDU 200 may include a repetition of the U-SIG field 210, for example, with a rotated constellation, for example, to indicate the ER PPDU format, e.g., as described below.

In some demonstrative aspects, a PPDU preamble 229 of ER PPDU 200 may be configured to include a legacy preamble 231, e.g., including the L-STF 202, the L-LTF 204, and the L-SIG field 206.

In some demonstrative aspects, the PPDU preamble 229 of ER PPDU 200 may be configured to include an EHT preamble 233, e.g., including the RL-SIG field 208 and the U-SIG field 210, for example, following the legacy preamble.

In some demonstrative aspects, the PPDU preamble 229 of ER PPDU 200 may be configured to include an ER preamble 235, e.g., a new ER preamble, for example, following the U-SIG field 210, e.g., as described below.

In some demonstrative aspects, ER preamble 235 may include an ER STF (ER-STF) 236, e.g., as described below.

In some demonstrative aspects, ER preamble 235 may include an ER LTF (ER-LTF) 238, for example, after the ER-STF 236, e.g., as described below.

In some demonstrative aspects, ER preamble 235 may include an ER Signal (ER-SIG) 240 field, for example, after the ER-LTF 238, e.g., as described below.

In some demonstrative aspects, ER PPDU 200 may include an ER data field 242, for example, after the PPDU preamble 235, e.g., as described below.

In some demonstrative aspects, ER PPDU 200 may be configured to provide a technical solution to support a receiver STA, which receives the ER PPDU 200, to differentiate the ER PPDU 200, for example, from other types of PPDUs, e.g., including non-HT PPDUs, HT PPDUs, Very High Throughput (VHT) PPDUs, High Efficiency (HE) PPDUs, and/or EHT PPDUs.

In some demonstrative aspects, ER PPDU 200 may be configured to be detected with one or more differentiations, e.g., as described below.

In some demonstrative aspects, ER PPDU 200 may be configured to indicate an ER PPDU format, for example, based on a PPDU type, for example, a UHR PHY type, e.g., a Wi-Fi 8 PPDU.

In some demonstrative aspects, the PPDU type, for example, a UHR PHY type, e.g., a Wi-Fi 8 PPDU, may be indicated, for example, based on a reserved value of version bits, e.g., version bits B0-B2, in U-SIG field 210, e.g., version bits B0-B2 included in PHY version identifier field 213 in a first subfield/part (U-SIG1) of the U-SIG field 210.

In some demonstrative aspects, ER PPDU 200 may be configured to indicate the ER PPDU format, for example, based on a version dependent bit (or entry) in the U-SIG field 210, for example, ER field 211.

In some demonstrative aspects, ER PPDU 200 may be configured to indicate the ER PPDU format, for example, based on a one bit (or entry) in a SIGNAL field symbol after the U-SIG field 210, e.g., an EHT-SIG symbol if the additional SIGNAL field symbol is used.

In some demonstrative aspects, ER PPDU 200 may be configured to indicate the ER PPDU format, for example, based on a combination of one of the reserved values of the version bits, e.g., version bits B0-B2, in U-SIG field 210, e.g., in the PHY version field 213 in the U-SIG1, for example, together with one version dependent bit (or entry) in the U-SIG field 210, e.g., the ER field 211, or one bit (or entry) in the SIGNAL field symbol after the U-SIG field 210, e.g., the EHT-SIG symbol if the additional SIGNAL field symbol is used.

In some demonstrative aspects, the version bits B0-B2 in the U-SIG1 field of the ER PPDU 200 may be set, e.g., as PHY version identifier 213, to indicate a UHR PHY version, e.g., a Wi-Fi 8 PPDU, and one bit (or entry) of disregard bits B20-B24 in the U-SIG1 field may be set, e.g., as ER field 211, to indicate an extended range mode, e.g., an ER mode of Wi-Fi 8 or any other ER mode.

In some demonstrative aspects, it may be advantageous to configure the indication of the extended range (ER) mode in the U-SIG1 field, for example, although there may be more available bits in a second subfield/part (U-SIG2) of the U-SIG field 210 than in the U-SIG1 field.

For example, configuring the indication of the ER mode in the U-SIG1 field may provide a technical solution to support a receiver of the ER PPDU 200 in determining when the ER-STF 236 is to be present, for example, ahead of time, e.g., to allow the receiver to timely turn on an Automatic Gain Control (AGC) mechanism.

For example, in case there is no additional SIGNAL field symbol right after the U-SIG field 210, configuring the indication of the extended range (ER) mode in the U-SIG1 field may provide the receiver with enough time to receive the indication of ER mode in the U-SIG1, and to decode the indication of ER, for example, during the reception of the U-SIG2. This may allow the receiver to know the presence of the ER-STF 236, for example, before the ER-STF 236 presents, and to timely turn on the AGC mechanism.

In other aspects, the indication of the extended range (ER) mode may be configured in the U-SIG2 field.

For example, in case that the indication of ER mode is implemented in the U-SIG2 and there is no additional SIGNAL field symbol right after the U-SIG field 210, there may be a situation where the receiver is not able to utilize the beginning portion of ER-STF 236, e.g., due to the decoding delay. In this case, the ER-STF 236 may be longer than a normal AGC setting time, for example, to accommodate the decoding delay.

In some demonstrative aspects, a format of a U-SIG1 field, e.g., configured for an ER PPDU, may include one or more of the following fields:

TABLE 1

| Two parts of U-SIG | Bit | Field | Number of bits | Description |
| --- | --- | --- | --- | --- |
| U-SIG-1 | B0-B2 | PHY Version identifier | 3 | Differentiate between different PHY clauses: Set to 0 for EHT. Set to 1 for UHR. Values 2-7 are Validate |
| | B3-B5 | Bandwidth | 3 | Set to 0 for 20 MHz. Set to 1 for 40 MHz. Set to 2 for 80 MHz. |

TABLE 1-continued

| Two parts of U-SIG | Bit | Field | Number of bits | Description |
|---|---|---|---|---|
| | | | | Set to 3 for 160 MHz. Set to 4 for 320 MHz-1. Set to 5 for 320 MHz-2. See definition of 320 MHz-1 and 320 MHz-2 in 36.3.23.2 (Channelization for 320 MHz channel). Values 6 and 7 are Validate. |
| | B6 | Punctured Channel Information | 1 | Indicates whether the PPDU is sent in UL or DL. Set to the TXVECTOR parameter UPLINK_FLAG. A value of 1 indicates the PPDU is addressed to an AP. A value of 0 indicates the PPDU is addressed to a non-AP STA. |
| | B7-B12 | BSS Color | 6 | An identifier of the BSS. Set to the TXVECTOR parameter BSS_COLOR. |
| | B13-B19 | TXOP | 7 | If the TXVECTOR parameter TXOP_DURATION is UNSPECIFIED, set to 127 to indicate the absence of duration information. If the TXVECTOR parameter TXOP_DURATION is an integer value, set to a value less than 127 to indicate duration information for NAV setting and protection of the TXOP as follows: If the TXVECTOR parameter TXOP_DURATION is less than 512, set to 2 × floor(TXOP_DURATION/8). Otherwise, set to 2 × floor((TXOP_DURATION − 512)/128) + 1. |
| | B20 | ER | 1 | Indicates whether it is ER PPDU or not: Set to 0 for non-ER PPDU Set to 1 for ER PPDU |
| | B21-B24 | Disregard | 4 | Set to all 1 s and treat as Disregard |
| | B25 | Validate | 1 | Set to 1 and treat as Validate |

In some demonstrative aspects, for example, devices 102 (FIG. 1), 140 (FIG. 1), and/or 160 (FIG. 1) may be configured to generate, transmit, receive and/or process one or more ER PPDUs, e.g., ER PPDU 200, including a U-SIG field, e.g., U-SIG field 210, which may include the U-SIG1 configured according to the format of the U-SIG1 field of Table 1.

In some demonstrative aspects, as shown Table 1, the U-SIG1 field may be configured to indicate an ER mode, e.g., as described below.

In some demonstrative aspects, as shown Table 1, the U-SIG1 field may be configured to indicate the ER mode, for example, by setting bits of a PHY version identifier field to a predefined value.

In some demonstrative aspects, as shown Table 1, the U-SIG1 field may be configured to indicate the ER mode, for example, by setting 3 bits of the PHY version identifier field to a predefined value.

In some demonstrative aspects, as shown Table 1, the U-SIG1 field may be configured to indicate the ER mode, for example, by setting bits B0-B2 of the PHY version identifier field to a predefined value, e.g., a value of "1".

In some demonstrative aspects, setting bits B0-B2 of the PHY version identifier field to the value of "1" may indicate a UHR PHY version.

In some demonstrative aspects, as shown Table 1, the U-SIG1 field may be configured to indicate the ER mode, for example, by setting an ER sub-field in the U-SIG1 field.

In some demonstrative aspects, as shown Table 1, the ER sub-field may include a single-bit sub-field.

In some demonstrative aspects, as shown Table 1, the ER sub-field may be configured based on a bit B20, e.g., a 20-th bit, of the U-SIG1 field.

In other aspects, another bit of the U-SIG1 field, e.g., a B21 bit, a B22 bit, a B23 bit or a B24 bit, may be configured as the ER sub-field.

In some demonstrative aspects, the ER sub-field of Table 1 may be configured to indicate whether a PPDU including the U-SIG1 field is an ER PPDU or not.

In some demonstrative aspects, the ER sub-field of Table 1 may be set to a first value, e.g., 0, for example, to indicate a non-ER PPDU.

In some demonstrative aspects, the ER sub-field of Table 1 may be set to a second value, e.g., 1, for example, to indicate an ER PPDU.

In some demonstrative aspects, ER PPDU 200 may be configured to indicate an ER PPDU format, for example, based on a repeated structure and rotated constellation of the U-SIG-1 field, a field (U-SIG-1R) including a repetition of the U-SIG-1 field, the U-SIG-2 field, and a field (U-SIG-2R) including a repetition of the U-SIG-2 field.

In some demonstrative aspects, ER PPDU 200 may be configured to indicate the ER PPDU format, for example, based on a combination of one of the reserved values of the version bits, e.g., version bits B0-B2, in U-SIG field 210, e.g., in the U-SIG1, for example, together with the repeated structure and rotated constellation of the U-SIG-1, U-SIG-1R, U-SIG-2 and U-SIG-2R fields, e.g., in accordance with a Wi-Fi 7 Standard. For example, the repeated structure and rotated constellation of the U-SIG-1, U-SIG-1R, U-SIG-2 and U-SIG-2R fields may be configured to indicate an ER PPDU, e.g., a Wi-Fi 8 extended range PPDU. For example, this setting may have a cost of two extra OFDM symbols.

In some demonstrative aspects, ER PPDU 200 may be configured to indicate an ER PPDU format, for example, by setting the PHY version identifier field of the U-SIG1 field, e.g., the PHY version identifier field of Table 1, to a predefined value configured to indicate a an ER PHY version. For example, the bits B0-B2 may be set to a predefined value, e.g., 2 or any other value greater than 1, to indicate the ER PHY version.

In some demonstrative aspects, the PPDU preamble 229 of ER PPDU 200 may be configured to provide a technical solution to support an Early Termination (ET) mechanism at a receiving STA, for example, in case the ER PPDU 200 is received by a STA, e.g., a legacy STA, for example, an 11be STA, an 11ax STA, an 11ac STA, an 11n STA, or an 11a STA.

In some demonstrative aspects, the ET mechanism may be configured to allow the receiving STA to process at least part of the PPDU preamble 229, and to determine based on the part of the PPDU preamble 229 not to decode the whole ER PPDU 200, for example, so that the receiving STA can save power.

Figure 3:
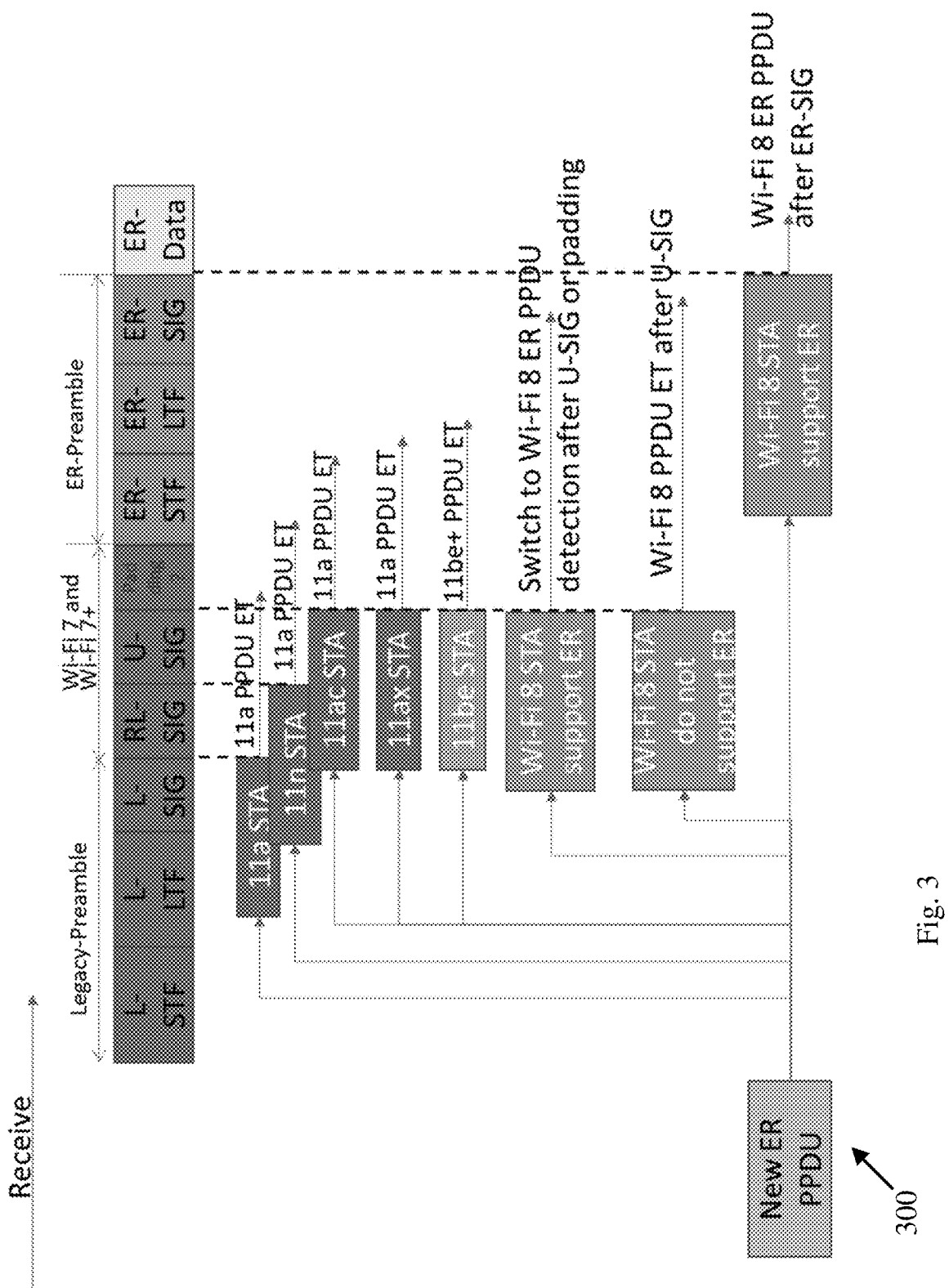
FIG. 3 is a schematic illustration of a decoding scheme of an ER PPDU, in accordance with some demonstrative aspects.

Reference is made to FIG. 3, which schematically illustrates a decoding scheme 300 of an ER PPDU, in accordance with some demonstrative aspects. For example, decoding scheme 300 shows how a receiving STA may apply an ET mechanism based on decoding of an ER PPDU, e.g., ER PPDU 200 (FIG. 2).

For example, as shown in FIG. 3, in case the ER PPDU, e.g., ER PPDU 200 (FIG. 2), is received by an 11ac STA, an 11n STA or an 11a STA, this STA may classify the ER PPDU as an 11a PPDU, and, accordingly, the receiving STA may defer access to the wireless medium, for example, based on a LENGTH field. For example, a 1st symbol after the L-SIG may be Binary Phase Shift Keying (BPSK) modulated. Accordingly, this symbol may not trigger 11n preamble detection. For example, the 2nd symbol after the L-SIG may be BPSK modulated. Accordingly, this symbol may not trigger 11ac preamble detection.

For example, as shown in FIG. 3, in case the ER PPDU, e.g., ER PPDU 200 (FIG. 2), is received by an 11ax STA, this STA may classify the ER PPDU as an 11a PPDU, accordingly, the receiving STA may defer access to the wireless medium, for example, based on the LENGTH field. For example, a 1st symbol after the L-SIG may be an L-SIG repetition, while the LENGTH mod 3=0. Accordingly, this setting may not trigger 11ax preamble detection. For example, the 1st and 2nd symbols after the L-SIG may both be BPSK modulated, which may be different from a non-HT mark.

For example, as shown in FIG. 3, in case the ER PPDU, e.g., ER PPDU 200 (FIG. 2), is received by an 11be STA, this STA may classify the ER PPDU as an 11be+ PPDU, and, accordingly, the receiving STA may defer access to the wireless medium, for example, based on the LENGTH field or based on a Transmit Opportunity (TxOP) and a Basic Service Set (BSS) color. However, the receiving STA may not trigger an IEEE 802.11be preamble detection, for example, since the B0-B2 bits of the PHY version field, may not be equal to 0, and, accordingly, may not indicate the 802.11be PHY Version Identifier.

For example, as shown in FIG. 3, in case the ER PPDU, e.g., ER PPDU 200 (FIG. 2), is received by a STA, e.g., a Wi-Fi 8 STA, supporting the ER mode, this STA may be able to detect the legacy preamble and to classify the received PPDU as either a non-ER PPDU or an ER PPDU. For example, the receiving STA may determine that the received PPDU is an ER PPDU according to the ER mode, for example, based on the ER mode indication in the U-SIG field e.g., as described above. For example, based on the determination that the received PPDU is an ER PPDU according to the ER mode, the receiving STA may switch to perform ER-STF and ER-LTF detection.

In some demonstrative aspects, one or more OFDM symbol added after the U-SIG, e.g., between U-SIG 210 (FIG. 2) and the ER preamble 235 (FIG. 2), for example, to provide a technical solution to support the receiving STA to switch to the ER-STF detection.

For example, as shown in FIG. 3, in case the ER PPDU, e.g., ER PPDU 200 (FIG. 2), is received by a STA, e.g., a Wi-Fi 8 STA, not supporting the ER mode, this STA may detect the legacy preamble, and may classify the received PPDU as the ER PPDU according to the ER mode. For example, the receiving STA may set a Network Allocation Vector (NAV), for example, based on the LENGTH in the L-SIG, or based on the TxOP and BSS color in the U-SIG.

For example, as shown in FIG. 3, in case the ER PPDU, e.g., ER PPDU 200 (FIG. 2), is received by a STA, e.g., a Wi-Fi 8 STA, supporting the ER mode, this STA may be configured to only detect the ER preamble, e.g., ER preamble 235 (FIG. 2) including ER-STF 236 (FIG. 2), ER-LTF 238 (FIG. 2), and ER-SIG 240 (FIG. 2). For example, this receiving STA may classify the received PPDU as a Wi-Fi 8 ER or an ER PPDU, for example, after the ER-SIG.

Referring back to FIG. 2, ER PPDU 200 may be configured to provide a technical solution, which may be backward compatible with legacy devices. For example, the ER-STF 236, and/or the ER-LTF 238 may not affect detection of the L-STF 202, L-LTF 204 and/or L-SIG field 206 by the legacy devices. Accordingly, the legacy devices may still able to defer the PPDU duration, for example, based on the LENGTH field in the L-SIG, e.g., as described above. Accordingly, the design of the ER PPDU 200 may provide a technical solution, which may have full backward compatibility.

In some demonstrative aspects, ER PPDU 200 may be configured to provide a technical solution to support detection by ER STA, for example, with relatively high reliability, e.g., even at low Received Signal Strength Indicator (RSSI) levels, such as −91 dBm, for example, with ER-STF 236, ER-LTF 238, ER-SIG field 240, and/or ER-data field 242, e.g., as described below.

In some demonstrative aspects, ER-STF 236 may be configured to provide a technical solution to enable an ER receiver to detect the ER PPDU 200, for example, with low RSSI.

In some demonstrative aspects, ER-STF field 236 may be positioned, for example, immediately after the U-SIG field 210, or an EHT-SIG field, e.g., if an EHT-SIG field is used.

In some demonstrative aspects, the ER-STF 236 may be configured with a period of 0.8 microseconds (μs), for example, with 10 or more periods.

In some demonstrative aspects, the ER-STF 236 may be configured with a period of 0.2/0.4 μs, for example, with 40/20 or more periods.

In other aspects, the ER-STF 236 may be configured with and other period duration and/or any other count of periods.

In some demonstrative aspects, the ER-STF 236 may be configured with an increased number of periods and/or a reduced duration of a period, for example, to provide a technical solution to enhance the detection of the ER-STF 236, for example, in the presence of strong noise and/or interference.

In some demonstrative aspects, an ER receiver, e.g., implemented by device 140 (FIG. 1), may be configured to combine two or more continuous periods and/or frequency processing, for example, to mitigate noise, and/or to achieve improved performance, e.g., up to about 9 dB performance improvement compared with a conventional L-STF detection.

In some demonstrative aspects, ER-LTF 238 may be configured to include more than two OFDM symbols, for example, to provide a technical solution to enhance channel estimation, e.g., in the presence of strong noise. For example, an increased number of LTF symbols may be implemented to provide additional signal power, e.g., in combating noise.

In some demonstrative aspects, ER-SIG field 240 may be transmitted by a robust modulation coding scheme for example, with frequency domain and/or time domain repetitions.

In some demonstrative aspects, ER-SIG field 240 may be transmitted according to an MCS 15, e.g., utilizing BPSK Dual Carrier Modulation (DCM) (BPSK-DCM).

In some demonstrative aspects, ER-SIG field 240 may be transmitted according to an MCS 14, e.g., utilizing a Duplicate (DUP) mode, for example, optionally together with time domain repetition, e.g., to repeat the U-SIG 210 in a U-SIG-R field.

In one example, it may be defined that thee format or MCS level for transmission of the E-SIG field 240 should be standardized and known to both the ER transmitter and the ER receiver.

In some demonstrative aspects, content of the ER-SIG field 240 may be configured to include information of one or more version independent fields in the U-SIG-1 field.

In some demonstrative aspects, the ER-SIG field 240 may be configured to include an indication for an ER PPDU identifier, for example, to indicate whether the PPDU is an ER PPDU or not.

In some demonstrative aspects, the ER-SIG field 240 may be configured to include data rate information relating to a data rate of the ER data field 242.

In some demonstrative aspects, the ER-SIG field 240 may be configured to include a length field to include length information based on a length of the ER data field 242.

In some demonstrative aspects, the ER-SIG field 240 may be configured to include an AID field including an AID corresponding to one or more intended recipients, for example, to support early reception termination.

In some demonstrative aspects, the ER-SIG field 240 may be configured to include any other additional or alternative information and/or fields.

In some demonstrative aspects, ER-data field 242 may be transmitted with the data rate defined in the ER-SIG 240.

In some demonstrative aspects, ER-data field 242 may be transmitted according to an MCS corresponding to the data rate.

In some demonstrative aspects, ER-data field 242 may be transmitted according to an MCS 0, 1, 14 or 15.

In some demonstrative aspects, ER-data field 242 may be transmitted according to a new MCS and/or any other suitable MCS.

In some demonstrative aspects, the U-SIG field 210 and the ER-SIG field 240 may include similar, or even identical, content.

In some demonstrative aspects, the U-SIG field 210 and the ER-SIG field 240 may be transmitted with different MCSs, and/or different PHY modes.

In some demonstrative aspects, ER PPDU 200 may be configured to include an extra SIG field, e.g., an extra Wi-Fi 8-SIG field, for example, following the U-SIG field 210. For example, the extra SIG field may be based on, or similar to, an EHT-SIG field for MU PPDU, e.g., in accordance with an IEEE 802.11be Specification. For example, the extra SIG field may be implemented, in case dependent bits in the U-SIG1 and U-SIG2 fields are not enough to carry ER PPDU PHY transmission parameters.

In some demonstrative aspects, an ER-capable STA, e.g., a Wi-Fi 8 STA, which supports the ER mode, may detect the ER PPDU 200 and may determine that the ER-capable STA is not an intended/addressed receiver of the ER PPDU 200. For example, the ER-capable STA nay be configured to set its NAV, for example, based on the LENGTH field, the data rate field, and/or the TxOP and BSS color, which may be defined in the ER-SIG field 240.

Referring back to FIG. 1, in some demonstrative aspects, device 102, device 140 and/or device 160 may be configured to generate, transmit, receive and/or process an ER PPDU according to an ER PPDU transmission sequence including a frame transmitted before the ER PPDU, e.g., as described below.

In some demonstrative aspects, the length field in an L-SIG field, e.g., L-SIG 202 (FIG. 2), may be used to indicate the duration of an ER PPDU or a TxOP, for example, such that legacy devices can hold back their transmissions during communication of the ER PPDU.

In some demonstrative aspects, in some use cases, scenarios, and/or implementations, there may be one or more technical issues when using the length field to set the TxOP duration. For example, a TxOP field in the U-SIG field 210 (FIG. 2) may be used to set the TxOP duration. However, this TxOP field may not be readable by some STAs, e.g., an 11a STA, an 11n STA, an 11ac STA, and/or an 11ax STA.

In some demonstrative aspects, device 102, device 140 and/or device 160 may be configured to generate, transmit, receive and/or process an ER PPDU according to an ER PPDU transmission sequence including multiple PPDUs to support sending of extended range data, e.g., as described below.

In some demonstrative aspects, controller 124 may be configured to control, trigger, cause, and/or instruct device 102 to transmit a Network Allocation Vector (NAV) setting (NAV-setting) PPDU configured to set a NAV based on a duration of an ER PPDU, e.g., as described below.

In some demonstrative aspects, the NAV-setting PPDU may be configured to be decodable by a non-ER STA, which is not capable of decoding the ER PPDU, e.g., a legacy STA.

In some demonstrative aspects, controller 124 may be configured to control, trigger, cause, and/or instruct device 102 to transmit the ER PPDU, for example, after the NAV-setting PPDU, e.g., as described below.

In some demonstrative aspects, the ER PPDU may include an ER preamble decodable by an ER STA, e.g., as descried below.

In some demonstrative aspects, the ER preamble may include an ER-STF, e.g., as described below.

In some demonstrative aspects, the ER preamble may include an ER-LTF, for example, after the ER-STF, e.g., as described below.

In some demonstrative aspects, the ER preamble may include an ER-SIG field, for example, after the ER-LTF, e.g., as described below.

In some demonstrative aspects, the ER PPDU may be configured to include the ER preamble immediately at a beginning of the ER PPDU, e.g., as described below.

In some demonstrative aspects, the ER PPDU may be configured to include a non-ER preamble, for example, prior to the ER preamble, e.g., as described below.

In some demonstrative aspects, the ER PPDU may be configured to include an L-STF, an L-LTF, for example, after the L-STF, and an L-SIG field, for example, after the L-LTF, e.g., as described below.

In some demonstrative aspects, the ER PPDU may be configured to include the ER preamble after the L-SIG field, e.g., as described below.

In some demonstrative aspects, the ER PPDU may be configured to include an RL-SIG field, for example, after the L-SIG field, and to include the ER preamble, for example, after the RL-SIG field, e.g., as described below.

In some demonstrative aspects, the ER PPDU may be configured to include an ER data field, for example, after the PPDU preamble, e.g., as described below.

In some demonstrative aspects, controller 124 may be configured to control, trigger, cause, and/or instruct device 102 to transmit a plurality of NAV-setting PPDUs prior to the ER PPDU, e.g., as described below.

In some demonstrative aspects, the plurality of NAV-setting PPDUs may include a first NAV-setting PPDU of a first non-ER PPDU format decodable by a first type of non-ER STAs, e.g., as described below.

In some demonstrative aspects, the plurality of NAV-setting PPDUs may include a second NAV-setting PPDU of a second non-ER PPDU format decodable by a second type of non-ER STAs, e.g., as described below.

In some demonstrative aspects, controller 124 may be configured to control, trigger, cause, and/or instruct device 102 to configure the NAV-setting PPDU to include a non-High-Throughput (non-HT) PPDU, which may be decodable by non-HT STAs, e.g., as described below.

In some demonstrative aspects, controller 124 may be configured to control, trigger, cause, and/or instruct device 102 to configure the NAV-setting PPDU to include an extended-range mode High Efficiency (HE) PPDU, which may be decodable by HE STAs, e.g., as described below.

In some demonstrative aspects, controller 124 may be configured to control, trigger, cause, and/or instruct device 102 to configure the NAV-setting PPDU to include an extended-range mode Extremely High Throughput (EHT) PPDU, which may be decodable by EHT STAs, e.g., as described below.

In some demonstrative aspects, controller 124 may be configured to control, trigger, cause, and/or instruct device 102 to configure the NAV-setting PPDU to include setting information corresponding to a setting of one or more parameters of the ER PPDU, e.g., as described below.

In some demonstrative aspects, controller 124 may be configured to control, trigger, cause, and/or instruct device 102 to configure the NAV-setting PPDU to include an indication of a PHY version of the ER PPDU, e.g., as described below.

In some demonstrative aspects, controller 124 may be configured to control, trigger, cause, and/or instruct device 102 to configure the NAV-setting PPDU to include an indication of a version of an ER mode of the ER PPDU, e.g., as described below.

In some demonstrative aspects, controller 124 may be configured to control, trigger, cause, and/or instruct device 102 to configure the NAV-setting PPDU to include an indication of a TxOP duration corresponding to the ER PPDU, e.g., as described below.

In some demonstrative aspects, controller 124 may be configured to control, trigger, cause, and/or instruct device 102 to configure the NAV-setting PPDU to include an indication of an MCS of the ER PPDU, e.g., as described below.

In some demonstrative aspects, controller 124 may be configured to control, trigger, cause, and/or instruct device 102 to configure the NAV-setting PPDU to include a Clear-To-Send (CTS) to self (CTS-to-Self) frame, e.g., as described below.

In other aspects, the NAV-setting PPDU may include any other type of frame.

Figure 4:
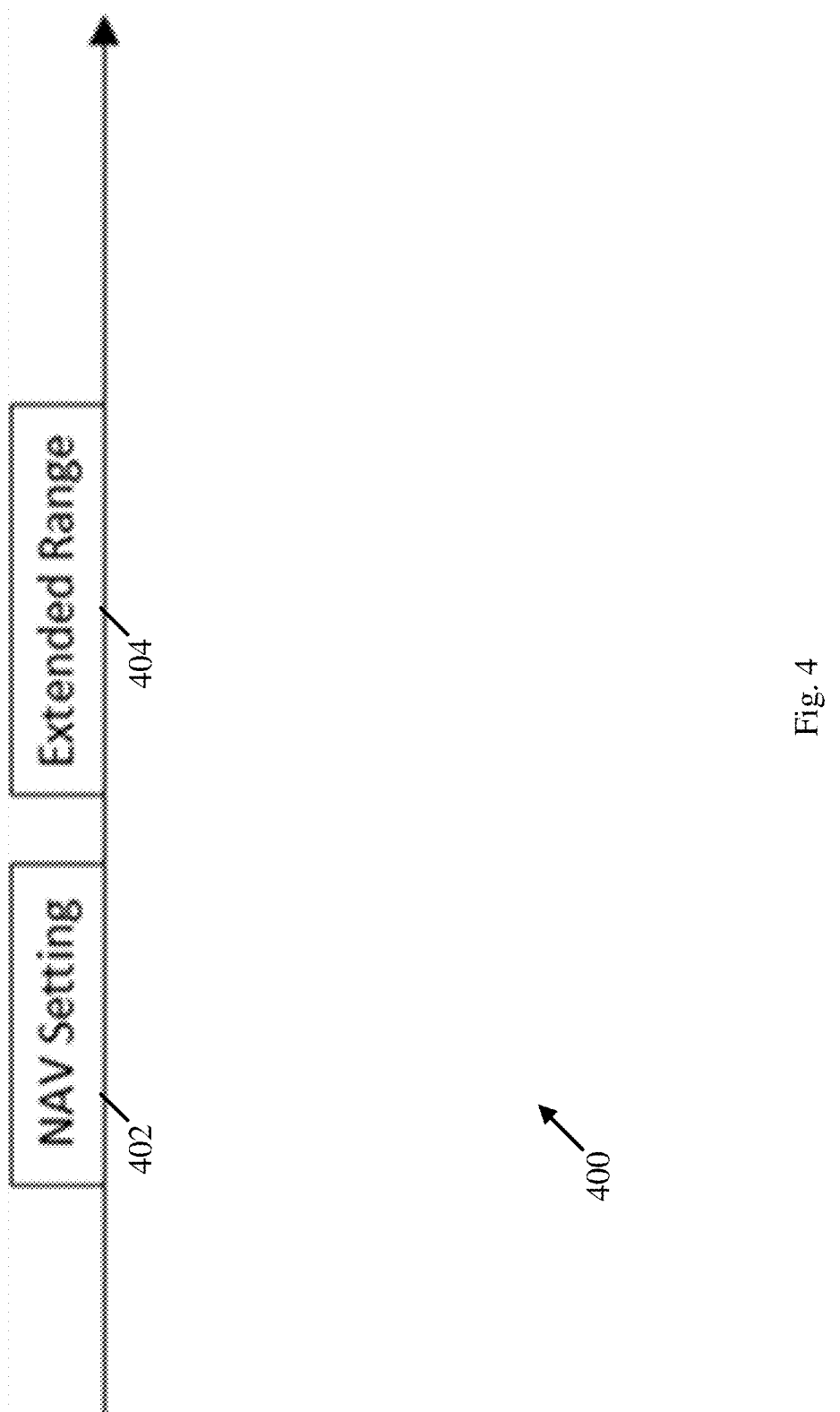
FIG. 4 is a schematic illustration of a transmission sequence of an ER PPDU, in accordance with some demonstrative aspects.

Reference is made to FIG. 4, which schematically illustrates a transmission sequence 400 of an ER PPDU 404, in accordance with some demonstrative aspects. For example, devices 102 (FIG. 1), 140 (FIG. 1), and/or 160 (FIG. 1) may be configured to generate, transmit, receive and/or process one or more ER PPDUs according to the transmission sequence 400.

In some demonstrative aspects, as shown in FIG. 4, transmission sequence 400 may include transmission of a NAV-setting PPDU 402, for example, prior to transmitting the ER PPDU 404.

In some demonstrative aspects, the NAV-Setting PPDU 402 may be configured to be decodable by legacy STAs, for example, to provide a technical solution to support coexistence with the legacy devices.

In some demonstrative aspects, the ER PPDU 404 may be configured to be decodable by ER STAs.

In some demonstrative aspects, the ER PPDU 404 may be configured to communicate extended range data and/or control or management frames.

In some demonstrative aspects, the NAV-setting PPDU 402 may be sent, for example, in a non-HT format, for example, a format configured to be decodable by 11a STAs. For example, the non-HT format may be implemented to provide a technical solution to support setting of a NAV and/or a TXOP duration properly, e.g., by all legacy devices, which may receive the NAV-setting PPDU 402.

In some demonstrative aspects, the NAV-setting PPDU 402 may be sent, for example, in extended range mode, e.g., in accordance with an IEEE 802.11ax Specification and/or an IEEE 802.11be Specification. For example, the extended range mode may be implemented to support greater coverage. In this case, older legacy devices, e.g., 11a STAs, 11n STAs, and/or 11ac STAs, may not be able to read the TxOP duration field in a MAC payload of the NAV-setting PPDU 402.

In some demonstrative aspects, multiple NAV-setting PPDUs 402 may be sent before the extended range PPDU 404, for example, to provide a technical solution in case there are multiple types of legacy devices, e.g., 11a STAs, 11n STAs, 11ac STAs, 11ax STAs, 11b STAs, and/or 11be STAs, are communicating in the same wireless communication frequency band.

In some demonstrative aspects, the multiple NAV-setting PPDUs 402 may be configured according to different PHY formats and/or versions, for example, including an 11a PHY version, an 11b PHY version, or the like.

In some demonstrative aspects, the NAV-setting PPDU 402 may be configured as a CTS-to-Self MAC frame type.

In some demonstrative aspects, the NAV-setting PPDU 402 may be configured to use any other frame type, which may be configured to properly set the NAV of the legacy STAs, and/or to indicate the upcoming extended range PPDU 404. For example, this design may provide a technical solution, which may be "future" proof, e.g., in the sense that this design may be compatible with future PHY versions.

In some demonstrative aspects, the NAV-setting frame 402 may be configured to specify parameters corresponding to the upcoming extended range PPDU 404, e.g., as described below.

In some demonstrative aspects, the NAV-setting frame 402 may be configured to signal a PHY version of the ER PPDU 404.

In some demonstrative aspects, the NAV-setting frame 402 may be configured to signal a version of an extended range mode of the ER PPDU 404.

In some demonstrative aspects, the NAV-setting frame 402 may be configured to signal a TxOP duration corresponding to the ER PPDU 404.

In some demonstrative aspects, the NAV-setting frame 402 may be configured to signal an MCS of the ER PPDU 404.

In some demonstrative aspects, the NAV-setting frame 402 may be configured to signal any other additional or alternative information corresponding to the ER PPDU 404.

In some demonstrative aspects, ER PPDU 404 may be configured to provide a technical solution to support a focus on range extension, e.g., as described below.

In some demonstrative aspects, ER PPDU 404 may be configured to support a technical solution to reduce a size of a preamble of the ER PPDU 404, for example, by excluding one or more preamble fields, for example, as a coexistence issue may be addressed by the preceding NAV-setting PPDU 402.

In some demonstrative aspects, ER PPDU 404 may be configured according to an ER PPDU format, which may exclude one or more preamble fields from a preamble for the ER PPDU, e.g., as described below.

In some demonstrative aspects, ER PPDU 404 may be configured according to an ER PPDU format, which may exclude from the preamble of the ER PPDU 404 one or more of an L-STF, an L-LTF, an L-SIG field, an RL-SIG field, an EHT-SIG fled, and/or a U-SIG field, e.g., as described below.

Figure 5:
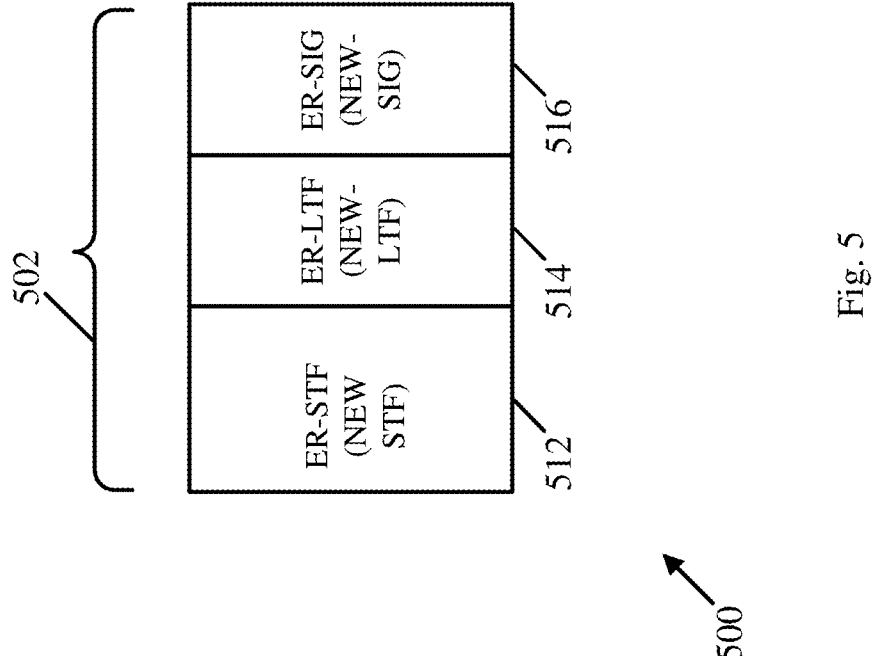
FIG. 5 is a schematic illustration of a preamble of an ER PPDU, in accordance with some demonstrative aspects.

Reference is made to FIG. 5, which schematically illustrates a preamble 500 of an ER PPDU, in accordance with some demonstrative aspects. For example, devices 102 (FIG. 1), 140 (FIG. 1), and/or 160 (FIG. 1) may be configured to generate, transmit, receive and/or process one or more ER PPDUs, e.g., ER PPDU 404 (FIG. 4), having a preamble, e.g., a shortened preamble, according to the structure and/or format of preamble 500.

In some demonstrative aspects, as shown in FIG. 5, preamble 500 may include an ER preamble 502, for example, immediately at a beginning of the ER PPDU.

In some demonstrative aspects, as shown in FIG. 5, ER preamble 502 may include an ER-STF (new-STF) 512. In one example, ER-STF 512 may be configured according to one or more attributes of ER-STF 236 (FIG. 2).

In some demonstrative aspects, as shown in FIG. 5, ER preamble 502 may include an ER ER-LTF (new-LTF) 514, for example, after the ER-STF 512. In one example, ER-LTF 514 may be configured according to one or more attributes of ER-LTF 238 (FIG. 2).

In some demonstrative aspects, as shown in FIG. 5, ER preamble 502 may include an ER-SIG (new-SIG) field 516, for example, after the ER-LTF 514. In one example, ER-SIG field 516 may be configured according to one or more attributes of ER-SIG field 240 (FIG. 2).

Figure 6:
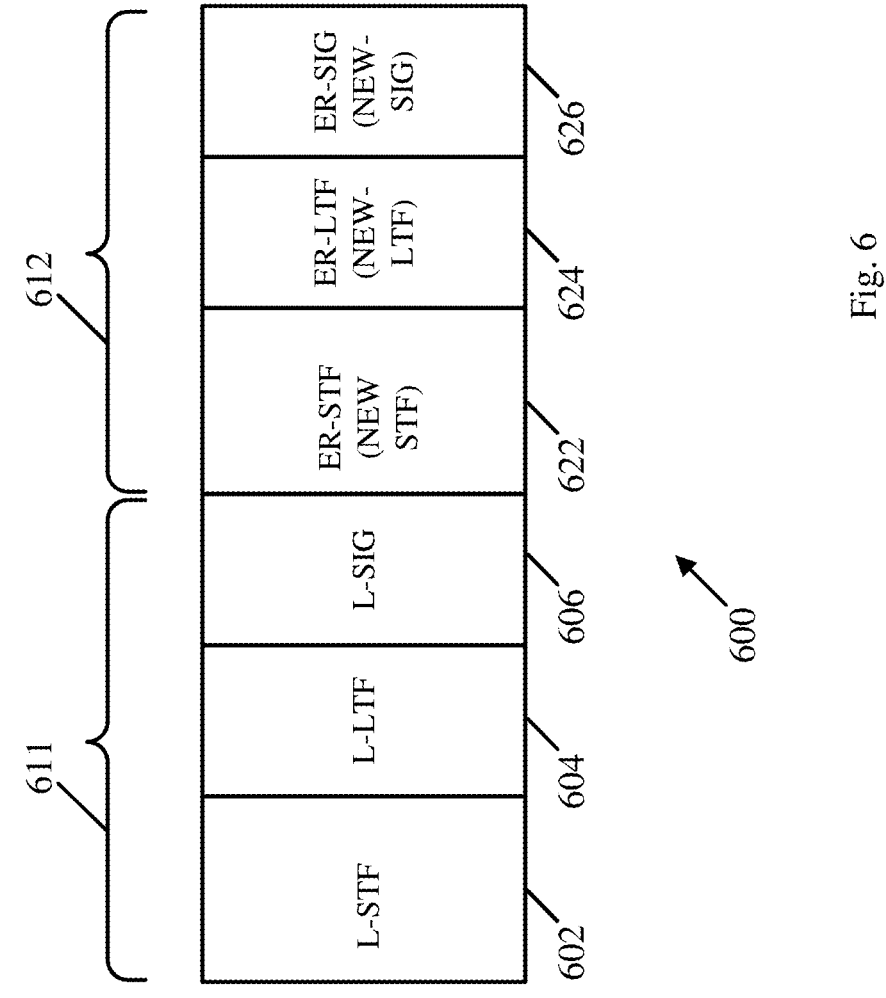
FIG. 6 is a schematic illustration of a preamble of an ER PPDU, in accordance with some demonstrative aspects.

Reference is made to FIG. 6, which schematically illustrates a preamble 600 of an ER PPDU, in accordance with some demonstrative aspects. For example, devices 102 (FIG. 1), 140 (FIG. 1), and/or 160 (FIG. 1) may be configured to generate, transmit, receive and/or process one or more ER PPDUs, e.g., ER PPDU 404 (FIG. 4), having a preamble, e.g., a shortened preamble, according to the structure and/or format of preamble 600.

In some demonstrative aspects, as shown in FIG. 6, preamble 600 may include a non-ER preamble 611, for example, including an L-STF 602, an L-LTF 604, e.g., after the L-STF 602, and an L-SIG field 606, e.g., after the L-LTF 604.

In some demonstrative aspects, as shown in FIG. 6, preamble 600 may include an ER preamble 612, for example, after the non-ER preamble 611. For example, ER preamble 612 may be after the L-SIG field 606.

In some demonstrative aspects, as shown in FIG. 6, ER preamble 612 may include an ER-STF (new-STF) 622. In one example, ER-STF 622 may be configured according to one or more attributes of ER-STF 236 (FIG. 2).

In some demonstrative aspects, as shown in FIG. 6, ER preamble 612 may include an ER ER-LTF (new-LTF) 624, for example, after the ER-STF 622. In one example, ER-LTF 624 may be configured according to one or more attributes of ER-LTF 238 (FIG. 2).

In some demonstrative aspects, as shown in FIG. 6, ER preamble 612 may include an ER-SIG (new-SIG) field 626, for example, after the ER-LTF 624. In one example, ER-SIG field 626 may be configured according to one or more attributes of ER-SIG field 240 (FIG. 2).

Figure 7:
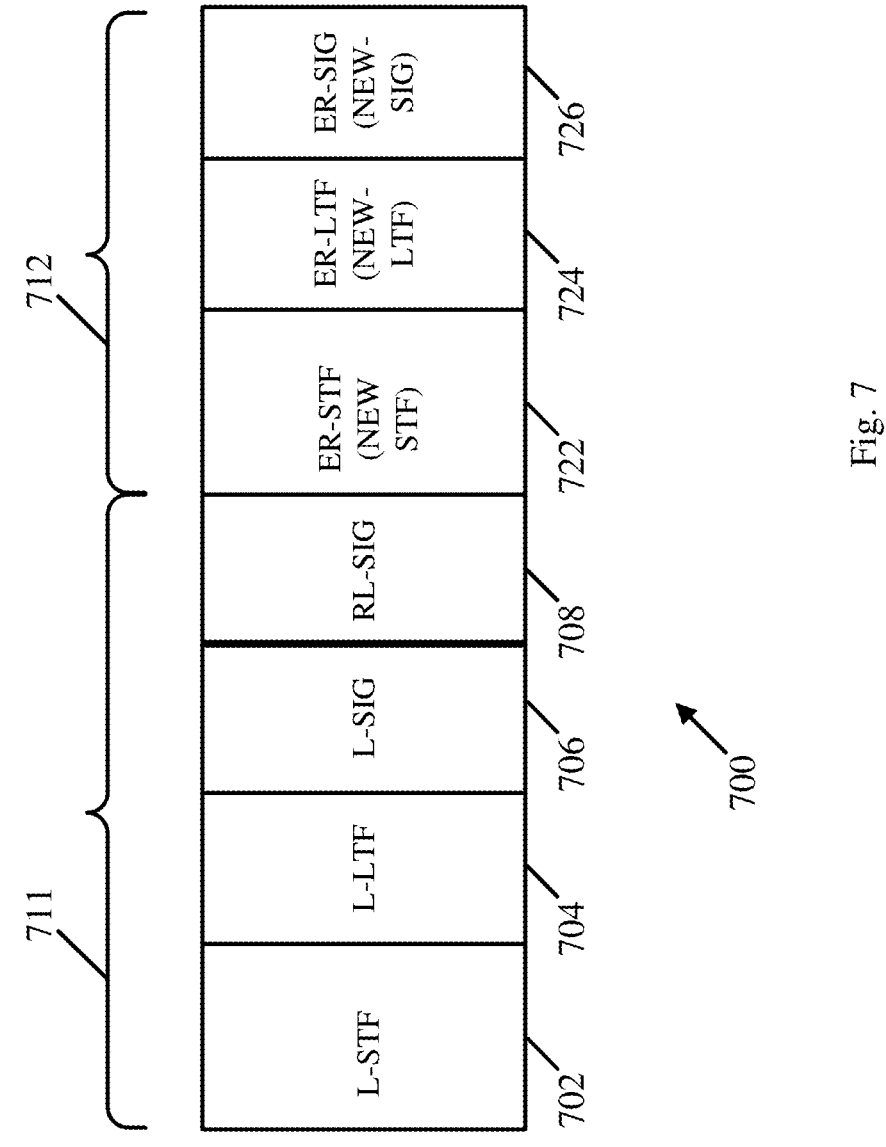
FIG. 7 is a schematic illustration of a preamble of an ER PPDU, in accordance with some demonstrative aspects.

Reference is made to FIG. 7, which schematically illustrates a preamble 700 of an ER PPDU, in accordance with some demonstrative aspects. For example, devices 102 (FIG. 1), 140 (FIG. 1), and/or 160 (FIG. 1) may be configured to generate, transmit, receive and/or process one or more ER PPDUs, e.g., ER PPDU 404 (FIG. 4), having a preamble, e.g., a shortened preamble, according to the structure and/or format of preamble 700.

In some demonstrative aspects, as shown in FIG. 7, preamble 700 may include a non-ER preamble 711, for example, including an L-STF 702, an L-LTF 704, e.g., after the L-STF 702, and an L-SIG field 706, e.g., after the L-LTF 704.

In some demonstrative aspects, as shown in FIG. 7, non-ER preamble 711 may include an RL-SIG field 708, for example, after the L-SIG field 706.

In some demonstrative aspects, as shown in FIG. 7, preamble 700 may include an ER preamble 712, for example, after the non-ER preamble 711. For example, ER preamble 712 may be after the RL-SIG field 708.

In some demonstrative aspects, as shown in FIG. 7, ER preamble 712 may include an ER-STF (new-STF) 722. In one example, ER-STF 722 may be configured according to one or more attributes of ER-STF 236 (FIG. 2).

In some demonstrative aspects, as shown in FIG. 7, ER preamble 712 may include an ER ER-LTF (new-LTF) 724, for example, after the ER-STF 722. In one example, ER-LTF 724 may be configured according to one or more attributes of ER-LTF 238 (FIG. 2).

In some demonstrative aspects, as shown in FIG. 7, ER preamble 712 may include an ER-SIG (new-SIG) field 726, for example, after the ER-LTF 724. In one example, ER-SIG field 726 may be configured according to one or more attributes of ER-SIG field 240 (FIG. 2).

Reference is made to FIG. 8, which schematically illustrates a method of communicating an ER PPDU, in accordance with some demonstrative aspects. For example, one or more of the operations of the method of FIG. 8 may be performed by one or more elements of a system, e.g., system 100 (FIG. 1), for example, one or more wireless devices, e.g., device 102 (FIG. 1), device 140 (FIG. 1), and/or device 160 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 802, the method may include generating a PPDU preamble including an L-STF, an L-LTF after the L-STF, an L-SIG field after the L-LTF, an RL-SIG field after the L-SIG field, a U-SIG field after the RL-SIG field, and an ER preamble after the U-SIG field. For example, the U-SIG field may be configured to indicate an ER PPDU format. For example, the ER preamble may include an ER-STF, an ER-LTF after the ER-STF, and an ER-SIG field after the ER-LTF. For example, controller 124 (FIG. 1) may be configured to cause, trigger, and/or control device 102 (FIG. 1) to generate the PPDU preamble, e.g., as described above.

As indicated at block 804, the method may include transmitting an ER PPDU including the PPDU preamble over a wireless communication channel. For example, controller 124 (FIG. 1) may be configured to cause, trigger, and/or control device 102 (FIG. 1) to transmit the ER PPDU including the PPDU preamble, e.g., as described above.

Reference is made to FIG. 9, which schematically illustrates a method of communicating an ER PPDU, in accordance with some demonstrative aspects. For example, one or more of the operations of the method of FIG. 9 may be performed by one or more elements of a system, e.g., system 100 (FIG. 1), for example, one or more wireless devices, e.g., device 102 (FIG. 1), device 140 (FIG. 1), and/or device 160 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 902, the method may include processing a PPDU preamble of an ER PPDU. For example, the PPDU preamble may include an L-STF, an L-LTF after the L-STF, an L-SIG field after the L-LTF, an RL-SIG field after the L-SIG field, and a U-SIG field after the RL-SIG field. For example, controller 154 (FIG. 1) may be configured to cause, trigger, and/or control device 140 (FIG. 1) to process the PPDU preamble of the ER PPDU, for example, from the device 102 (FIG. 1), e.g., as described above.

As indicated at block 904, the method may include processing an ER preamble of the PPDU preamble after the U-SIG field, for example, based on a determination that the U-SIG field indicates an ER PPDU format. For example, the ER preamble may include an ER-STF, an ER-LTF after the ER-STF, and an ER-SIG field after the ER-LTF. For example, controller 154 (FIG. 1) may be configured to cause, trigger, and/or control device 140 (FIG. 1) to process the ER preamble of the PPDU preamble after the U-SIG field, for example, based on a determination that the U-SIG field indicates an ER PPDU format, e.g., as described above.

Reference is made to FIG. 10, which schematically illustrates a method of communicating an ER PPDU, in accordance with some demonstrative aspects. For example, one or more of the operations of the method of FIG. 10 may be performed by one or more elements of a system, e.g., system 100 (FIG. 1), for example, one or more wireless devices, e.g., device 102 (FIG. 1), device 140 (FIG. 1), and/or device 160 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 1002, the method may include transmitting a NAV setting (NAV-setting) PPDU configured to set a NAV based on a duration of an ER PPDU. For example, the NAV-setting PPDU may be configured to be decodable by a non-ER STA, which is not capable of decoding the ER PPDU. For example, controller 124 (FIG. 1) may be configured to cause, trigger, and/or control device 120 (FIG. 1) to transmit the NAV-setting PPDU, e.g., as described above.

As indicated at block 1004, the method may include transmitting the ER PPDU after the NAV-setting PPDU. For example, the ER PPDU may include an ER preamble decodable by an ER STA. For example, the ER preamble may include an ER-STF, an ER-LTF after the ER-STF, and an ER-SIG field after the ER-LTF. For example, controller 124 (FIG. 1) may be configured to cause, trigger, and/or control device 102 (FIG. 1) to transmit the ER PPDU after the NAV-setting PPDU, e.g., as described above.

Figure 11:
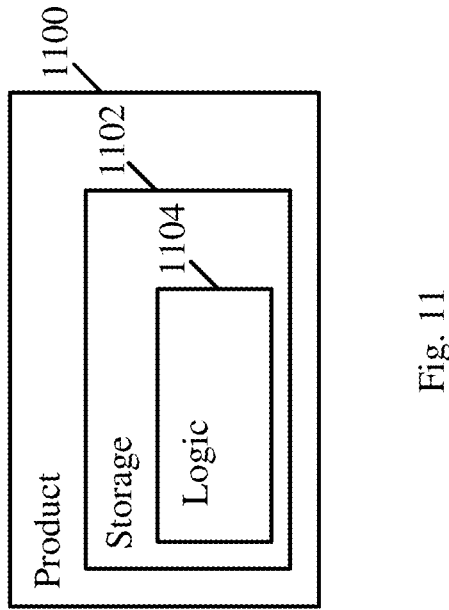
FIG. 11 is a schematic illustration of a product of manufacture, in accordance with some demonstrative aspects.

Reference is made to FIG. 11, which schematically illustrates a product of manufacture 1100, in accordance with some demonstrative aspects. Product 1100 may include one or more tangible computer-readable ("machine-readable") non-transitory storage media 1102, which may include computer-executable instructions, e.g., implemented by logic 1104, operable to, when executed by at least one computer processor, enable the at least one computer processor to implement one or more operations at device 102 (FIG. 1), device 140 (FIG. 1), device 160 (FIG. 1), controller 124 (FIG. 1), controller 154 (FIG. 1), message processor 128 (FIG. 1), message processor 158 (FIG. 1), radio 114 (FIG. 1), radio 144 (FIG. 1), transmitter 118 (FIG. 1), transmitter 148 (FIG. 1), receiver 116 (FIG. 1), and/or receiver 146 (FIG. 1); to cause device 102 (FIG. 1), device 140 (FIG. 1), device 160 (FIG. 1), controller 124 (FIG. 1), controller 154 (FIG. 1), message processor 128 (FIG. 1), message processor 158 (FIG. 1), radio 114 (FIG. 1), radio 144 (FIG. 1), transmitter 118 (FIG. 1), transmitter 148 (FIG. 1), receiver 116 (FIG. 1), and/or receiver 146 (FIG. 1) to perform, trigger and/or implement one or more operations and/or functionalities; and/or to perform, trigger and/or implement one or more operations and/or functionalities described with reference to the FIGS. 1-11, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1100 and/or machine readable storage media 1102 may include one or more types of computer-readable storage media capable of storing data, including volatile memory, non-volatile memory, removable or non-removable memory, erasable or non-erasable memory, writeable or re-writeable memory, and the like. For example, machine readable storage media 1102 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a hard drive, an optical disk, a magnetic disk, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1104 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1104 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising logic and circuitry configured to cause a wireless communication device to generate a Physical layer (PHY) Protocol Data Unit (PPDU) preamble, the PPDU preamble comprising a non-High-Throughput (non-HT) Short Training Field (L-STF), a non-HT Long Training Field (L-LTF) after the L-STF, a non-HT Signal (L-SIG) field after the L-LTF, a Repeated L-SIG (RL-SIG) field after the L-SIG field, a Unified Signal (U-SIG) field after the RL-SIG field, and an Extended Range (ER) preamble after the U-SIG field, wherein the U-SIG field is configured to indicate an ER PPDU format, wherein the ER preamble comprises an ER STF (ER-STF), an ER LTF (ER-LTF) after the ER-STF, and an ER Signal (ER-SIG) field after the ER-LTF; and transmit an ER PPDU comprising the PPDU preamble over a wireless communication channel.

Example 2 includes the subject matter of Example 1, and optionally, wherein the U-SIG field comprises an ER field configured to indicate the ER PPDU format.

Example 3 includes the subject matter of Example 2, and optionally, wherein the ER field comprises a 1-bit field set to a value of 1.

Example 4 includes the subject matter of Example 2 or 3, and optionally, wherein the ER field comprises a 20-th bit of the U-SIG field.

Example 5 includes the subject matter of any one of Examples 2-4, and optionally, wherein the U-SIG field comprises a PHY version identifier field configured to indicate a PHY version supporting the ER PPDU.

Example 6 includes the subject matter of any one of Examples 2-5, and optionally, wherein the U-SIG field comprises a PHY version identifier field configured to indicate an Ultra High Reliability (UHR) PHY version.

Example 7 includes the subject matter of any one of Examples 2-6, and optionally, wherein the U-SIG field comprises a PHY version identifier field comprising a value of 1.

Example 8 includes the subject matter of Example 1, and optionally, wherein the PPDU preamble comprises a repetition of the U-SIG field with a rotated constellation to indicate the ER PPDU format.

Example 9 includes the subject matter of Example 1, and optionally, wherein the U-SIG field comprises a PHY version identifier field comprising a bit to indicate the ER PPDU format.

Example 10 includes the subject matter of any one of Examples 1-9, and optionally, wherein the ER-STF comprises 10 or more repetitions of an ER-STF structure, the ER-STF structure having a duration of 0.8 microseconds.

Example 11 includes the subject matter of any one of Examples 1-10, and optionally, wherein the ER-STF comprises 40 or more repetitions of an ER-STF structure, the ER-STF structure having a duration of 0.2 microseconds.

Example 12 includes the subject matter of any one of Examples 1-11, and optionally, wherein the ER-STF comprises 20 or more repetitions of an ER-STF structure, the ER-STF structure having a duration of 0.4 microseconds.

Example 13 includes the subject matter of any one of Examples 1-12, and optionally, wherein the ER-LTF comprises 3 or more Orthogonal Frequency Division Multiplexing (OFDM) symbols.

Example 14 includes the subject matter of any one of Examples 1-13, and optionally, wherein the ER-SIG field comprises an ER PPDU identifier to identify the ER PPDU format.

Example 15 includes the subject matter of any one of Examples 1-14, and optionally, wherein the ER-SIG field comprises at least one of a data rate field, a length field, or an Association Identifier (AID) field.

Example 16 includes the subject matter of any one of Examples 1-15, and optionally, wherein the ER-SIG field comprises one or more version-independent fields of the U-SIG.

Example 17 includes the subject matter of any one of Examples 1-16, and optionally, wherein the ER-SIG field is encoded according to a Modulation and Coding Scheme (MCS) 14 or an MCS 15.

Example 18 includes the subject matter of any one of Examples 1-17, and optionally, wherein the U-SIG field is encoded according to a first Modulation and Coding Scheme (MCS), and the ER-SIG field is encoded according to a second MCS different from the first MCS.

Example 19 includes the subject matter of any one of Examples 1-18, and optionally, wherein the U-SIG field is configured for transmission according to a first PHY mode, and the ER-SIG field is configured for transmission according to a second PHY mode different from the first PHY mode.

Example 20 includes the subject matter of any one of Examples 1-19, and optionally, wherein the ER PPDU comprises an ER data field after the PPDU preamble.

Example 21 includes the subject matter of Example 20, and optionally, wherein the ER data field is encoded according to a Modulation and Coding Scheme (MCS) 0, an MCS 1, an MCS 14, an MCS 15, or an MCS greater than 15.

Example 22 includes the subject matter of any one of Examples 1-21, and optionally, wherein the PPDU preamble comprises one or more Orthogonal Frequency Division Multiplexing (OFDM) symbols between the U-SIG field and the ER preamble.

Example 23 includes the subject matter of any one of Examples 1-22, and optionally, comprising a radio to transmit the ER PPDU.

Example 24 includes the subject matter of Example 23, and optionally, comprising one or more antennas connected to the radio, and a processor to execute instructions of an operating system of the wireless communication device.

Example 25 includes an apparatus comprising logic and circuitry configured to cause a wireless communication device to process a Physical layer (PHY) Protocol Data Unit (PPDU) preamble of an Extended Range (ER) PPDU, the PPDU preamble comprising a non-High-Throughput (non-HT) Short Training Field (L-STF), a non-HT Long Training Field (L-LTF) after the L-STF, a non-HT Signal (L-SIG) field after the L-LTF, a Repeated L-SIG (RL-SIG) field after the first SIG field, and a Unified Signal (U-SIG) field after the RL-SIG field; and based on a determination that the U-SIG field indicates an ER PPDU format, process an ER preamble of the PPDU preamble after the U-SIG field, wherein the ER preamble comprises an ER STF (ER-STF), an ER LTF (ER-LTF) after the ER-STF, and an ER Signal (ER-SIG) field after the ER-LTF.

Example 26 includes the subject matter of Example 25, and optionally, wherein the U-SIG field comprises an ER field configured to indicate the ER PPDU format.

Example 27 includes the subject matter of Example 26, and optionally, wherein the ER field comprises a 1-bit field set to a value of 1.

Example 28 includes the subject matter of Example 26 or 27, and optionally, wherein the ER field comprises a 20-th bit of the U-SIG field.

Example 29 includes the subject matter of any one of Examples 26-28, and optionally, wherein the U-SIG field comprises a PHY version identifier field configured to indicate a PHY version supporting the ER PPDU.

Example 30 includes the subject matter of any one of Examples 26-29, and optionally, wherein the U-SIG field comprises a PHY version identifier field configured to indicate an Ultra High Reliability (UHR) PHY version.

Example 31 includes the subject matter of any one of Examples 26-30, and optionally, wherein the U-SIG field comprises a PHY version identifier field comprising a value of 1.

Example 32 includes the subject matter of Example 25, and optionally, wherein the PPDU preamble comprises a repetition of the U-SIG field with a rotated constellation to indicate the ER PPDU format.

Example 33 includes the subject matter of Example 25, and optionally, wherein the U-SIG field comprises a PHY version identifier field comprising a bit to indicate the ER PPDU format.

Example 34 includes the subject matter of any one of Examples 25-33, and optionally, wherein the ER-STF comprises 10 or more repetitions of an ER-STF structure, the ER-STF structure having a duration of 0.8 microseconds.

Example 35 includes the subject matter of any one of Examples 25-34, and optionally, wherein the ER-STF comprises 40 or more repetitions of an ER-STF structure, the ER-STF structure having a duration of 0.2 microseconds.

Example 36 includes the subject matter of any one of Examples 25-35, and optionally, wherein the ER-STF comprises 20 or more repetitions of an ER-STF structure, the ER-STF structure having a duration of 0.4 microseconds.

Example 37 includes the subject matter of any one of Examples 25-36, and optionally, wherein the ER-LTF comprises 3 or more Orthogonal Frequency Division Multiplexing (OFDM) symbols.

Example 38 includes the subject matter of any one of Examples 25-37, and optionally, wherein the ER-SIG field comprises an ER PPDU identifier to identify the ER PPDU format.

Example 39 includes the subject matter of any one of Examples 25-38, and optionally, wherein the ER-SIG field comprises at least one of a data rate field, a length field, or an Association Identifier (AID) field.

Example 40 includes the subject matter of any one of Examples 25-39, and optionally, wherein the ER-SIG field comprises one or more version-independent fields of the U-SIG.

Example 41 includes the subject matter of any one of Examples 25-40, and optionally, wherein the ER-SIG field is encoded according to a Modulation and Coding Scheme (MCS) 14 or an MCS 15.

Example 42 includes the subject matter of any one of Examples 25-41, and optionally, wherein the U-SIG field is encoded according to a first Modulation and Coding Scheme (MCS), and the ER-SIG field is encoded according to a second MCS different from the first MCS.

Example 43 includes the subject matter of any one of Examples 25-42, and optionally, wherein the U-SIG field is configured for transmission according to a first PHY mode, and the ER-SIG field is configured for transmission according to a second PHY mode different from the first PHY mode.

Example 44 includes the subject matter of any one of Examples 25-43, and optionally, wherein the ER PPDU comprises an ER data field after the PPDU preamble.

Example 45 includes the subject matter of Example 44, and optionally, wherein the ER data field is encoded according to a Modulation and Coding Scheme (MCS) 0, an MCS 1, an MCS 14, an MCS 15, or an MCS greater than 15.

Example 46 includes the subject matter of any one of Examples 25-45, and optionally, wherein the PPDU preamble comprises one or more Orthogonal Frequency Division Multiplexing (OFDM) symbols between the U-SIG field and the ER preamble.

Example 47 includes the subject matter of any one of Examples 25-46, and optionally, comprising a radio to receive the ER PPDU.

Example 48 includes the subject matter of Example 47, and optionally, comprising one or more antennas connected to the radio, and a processor to execute instructions of an operating system of the wireless communication device.

Example 49 includes an apparatus comprising logic and circuitry configured to cause a wireless communication device to transmit a Network Allocation Vector (NAV) setting (NAV-setting) Physical layer (PHY) Protocol Data Unit (PPDU) configured to set a NAV based on a duration of an Extended Range (ER) PPDU, wherein the NAV-setting PPDU is decodable by a non-ER wireless communication (STA), which is not capable of decoding the ER PPDU; and transmit the ER PPDU after the NAV-setting PPDU, wherein the ER PPDU comprises an ER preamble decodable by an ER STA, the ER preamble comprising an ER Short Training Field (ER-STF), an ER Long Training Field (ER-LTF) after the ER-STF, and an ER Signal (ER-SIG) field after the ER-LTF.

Example 50 includes the subject matter of Example 49, and optionally, wherein the ER preamble is immediately at a beginning of the ER PPDU.

Example 51 includes the subject matter of Example 49, and optionally, wherein the ER PPDU comprises a non-High-Throughput (non-HT) Short Training Field (L-STF), a non-HT Long Training Field (L-LTF) after the L-STF, an a non-HT Signal (L-SIG) field after the L-LTF, wherein the ER preamble is after the L-SIG field.

Example 52 includes the subject matter of Example 51, and optionally, wherein the ER PPDU comprises a Repeated L-SIG (RL-SIG) field after the L-SIG field, wherein the ER preamble is after the RL-SIG field.

Example 53 includes the subject matter of any one of Examples 49-52, and optionally, wherein the ER PPDU comprises an ER data field after the PPDU preamble.

Example 54 includes the subject matter of any one of Examples 49-53, and optionally, wherein the apparatus is configured to cause the wireless communication device to transmit a plurality of NAV-setting PPDUs prior to the ER PPDU, the plurality of NAV-setting PPDUs comprises a first NAV-setting PPDU of a first non-ER PPDU format decodable by a first type of non-ER STAs, and a second NAV-setting PPDU of a second non-ER PPDU format decodable by a second type of non-ER STAs.

Example 55 includes the subject matter of any one of Examples 49-54, and optionally, wherein the NAV-setting PPDU comprises a non-High-Throughput (non-HT) PPDU decodable by non-HT STAs.

Example 56 includes the subject matter of any one of Examples 49-54, and optionally, wherein the NAV-setting PPDU comprises an extended-range mode High Efficiency (HE) PPDU decodable by HE STAs.

Example 57 includes the subject matter of any one of Examples 49-54, and optionally, wherein the NAV-setting PPDU comprises an extended-range mode Extremely High Throughput (EHT) PPDU decodable by EHT STAs.

Example 58 includes the subject matter of any one of Examples 49-57, and optionally, wherein the NAV-setting PPDU comprises setting information corresponding to a setting of one or more parameters of the ER PPDU.

Example 59 includes the subject matter of any one of Examples 49-58, and optionally, wherein the NAV-setting PPDU comprises an indication of a PHY version of the ER PPDU.

Example 60 includes the subject matter of any one of Examples 49-59, and optionally, wherein the NAV-setting PPDU comprises an indication of a version of an ER mode of the ER PPDU.

Example 61 includes the subject matter of any one of Examples 49-60, and optionally, wherein the NAV-setting PPDU comprises an indication of a Transmit Opportunity (TxOP) duration corresponding to the ER PPDU.

Example 62 includes the subject matter of any one of Examples 49-61, and optionally, wherein the NAV-setting PPDU comprises an indication of a Modulation and Coding Scheme (MCS) of the ER PPDU.

Example 63 includes the subject matter of any one of Examples 49-62, and optionally, wherein the NAV-setting PPDU comprises a Clear-To-Send (CTS) to self (CTS-to-Self) frame.

Example 64 includes the subject matter of any one of Examples 49-63, and optionally, comprising a radio to transmit the NAV-setting PPDU and the ER PPDU.

Example 65 includes the subject matter of Example 64, and optionally, comprising one or more antennas connected to the radio, and a processor to execute instructions of an operating system of the wireless communication device.

Example 66 comprises a wireless communication device comprising the apparatus of any of Examples 1-65.

Example 67 comprises an apparatus comprising means for executing any of the described operations of any of Examples 1-65.

Example 68 comprises a product comprising one or more tangible computer-readable non-transitory storage media comprising computer-executable instructions operable to, when executed by at least one processor, enable the at least one processor to cause a wireless communication device to perform any of the described operations of any of Examples 1-65.

Example 69 comprises an apparatus comprising: a memory interface; and processing circuitry configured to: perform any of the described operations of any of Examples 1-65.

Example 70 comprises a method comprising any of the described operations of any of Examples 1-65.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a processor configured to cause an Ultra High Reliability (UHR) station (STA) to:
generate a Physical layer (PHY) Protocol Data Unit (PPDU) preamble comprising a first plurality of preamble fields, and a second plurality of preamble fields after the first plurality of preamble fields, the second plurality of preamble fields configured for an extended-range PPDU format,
wherein the first plurality of preamble fields comprises a non-High-Throughput (non-HT) Short Training Field (STF) (L-STF), a non-HT Long Training Field (LTF) (L-LTF) after the L-STF, a non-HT Signal (L-SIG) field after the L-LTF, a Repeated L-SIG (RL-SIG) field after the L-SIG field, and a Unified Signal (U-SIG) field after the RL-SIG field, the U-SIG field comprises a PHY version identifier subfield configured to indicate a UHR PHY version, the U-SIG field comprises a predefined subfield after the PHY version identifier subfield, the predefined subfield set to a predefined value configured to indicate the extended-range PPDU format,
wherein the second plurality of preamble fields comprises an STF configured for the extended-range PPDU format, an LTF configured for the extended-range PPDU format, and an extended-range signal (SIG) field; and transmit an extended-range PPDU comprising the PPDU preamble over a wireless communication channel to support an extended range for PPDU wireless communication and to support backward compatibility; and a memory to store information processed by the processor.

2. The apparatus of claim 1, wherein the PPDU preamble comprises one or more Orthogonal Frequency Division Multiplexing (OFDM) symbols between the U-SIG field and the STF configured for the extended-range PPDU format, the one or more OFDM symbols configured to support detection at a receiver.

3. The apparatus of claim 1, wherein the PPDU preamble comprises a plurality of Orthogonal Frequency Division Multiplexing (OFDM) symbols between the U-SIG field and the STF configured for the extended-range PPDU format.

4. The apparatus of claim 1, wherein the PHY version identifier subfield is configured to indicate a PHY version supporting the extended-range PPDU format.

5. The apparatus of claim 1, configured to cause the UHR STA to convert a Media-Access Control Protocol Data Unit (MPDU) into the extended-range PPDU by encoding and modulating the MPDU.

6. The apparatus of claim 1, wherein the PHY version identifier subfield is set to a value of 1.

7. The apparatus of claim 1, wherein the STF configured for the extended-range PPDU format comprises a plurality of repetitions of an STF structure having a duration of 0.8 microseconds.

8. The apparatus of claim 1, wherein the extended-range SIG field comprises an extended-range identifier subfield to identify the extended-range PPDU format.

9. The apparatus of claim 1, wherein the extended-range SIG field comprises a length field set based on a length of a data field in the extended-range PPDU.

10. The apparatus of claim 1, wherein the extended-range PPDU comprises an extended-range data field after the PPDU preamble.

11. The apparatus of claim 10, wherein the extended-range data field is encoded according to a Modulation and Coding Scheme (MCS) 0, or an MCS 1.

12. The apparatus of claim 1, configured to cause the UHR STA to transmit the extended-range PPDU over a 20 Megahertz (MHz) bandwidth.

13. The apparatus of claim 1, comprising a radio to transmit the extended-range PPDU from the UHR STA.

14. The apparatus of claim 13, comprising one or more antennas connected to the radio, and a processor to execute instructions of an operating system.

15. A product comprising one or more tangible computer-readable non-transitory storage media comprising instructions operable to, when executed by at least one processor, enable the at least one processor to cause an Ultra High Reliability (UHR) station (STA) to:

generate a Physical layer (PHY) Protocol Data Unit (PPDU) preamble comprising a first plurality of preamble fields, and a second plurality of preamble fields after the first plurality of preamble fields, the second plurality of preamble fields configured for an extended-range PPDU format, wherein the first plurality of preamble fields comprises a non-High-Throughput (non-HT) Short Training Field (STF) (L-STF), a non-HT Long Training Field (LTF) (L-LTF) after the L-STF, a non-HT Signal (L-SIG) field after the L-LTF, a Repeated L-SIG (RL-SIG) field after the L-SIG field, and a Unified Signal (U-SIG) field after the RL-SIG field, the U-SIG field comprises a PHY version identifier subfield configured to indicate a UHR PHY version, the U-SIG field comprises a predefined subfield after the PHY version identifier subfield, the predefined subfield set to a predefined value configured to indicate the extended-range PPDU format, wherein the second plurality of preamble fields comprises an STF configured for the extended-range PPDU format, an LTF configured for the extended-range PPDU format, and an extended-range signal (SIG) field; and transmit an extended-range PPDU comprising the PPDU preamble over a wireless communication channel to support an extended range for PPDU wireless communication and to support backward compatibility.

16. The product of claim 15, wherein the PPDU preamble comprises one or more Orthogonal Frequency Division Multiplexing (OFDM) symbols between the U-SIG field and the STF configured for the extended-range PPDU format.

17. The product of claim 15, wherein the extended-range SIG field comprises an extended-range identifier subfield to identify the extended-range PPDU format.

18. The product of claim 15, wherein the instructions, when executed, cause the UHR STA to transmit the extended-range PPDU over a 20 Megahertz (MHz) bandwidth.

19. An apparatus for an Ultra High Reliability (UHR) station (STA), the apparatus comprising:

means for generating a Physical layer (PHY) Protocol Data Unit (PPDU) preamble comprising a first plurality of preamble fields, and a second plurality of preamble fields after the first plurality of preamble fields, the second plurality of preamble fields configured for an extended-range PPDU format, wherein the first plurality of preamble fields comprises a non-High-Throughput (non-HT) Short Training Field (STF) (L-STF), a non-HT Long Training Field (LTF) (L-LTF) after the L-STF, a non-HT Signal (L-SIG) field after the L-LTF, a Repeated L-SIG (RL-SIG) field after the L-SIG field, and a Unified Signal (U-SIG) field after the RL-SIG field, the U-SIG field comprises a PHY version identifier subfield configured to indicate a UHR PHY version, the U-SIG field comprises a predefined subfield after the PHY version identifier subfield, the predefined subfield set to a predefined value configured to indicate the extended-range PPDU format, wherein the second plurality of preamble fields comprises an STF configured for the extended-range PPDU format, an LTF configured for the extended-range PPDU format, and an extended-range signal (SIG) field; and means for causing the UHR STA to transmit an extended-range PPDU comprising the PPDU preamble over a wireless communication channel to support an extended range for PPDU wireless communication and to support backward compatibility.

20. The apparatus of claim 19, wherein the extended-range SIG field comprises a length field set based on a length of a data field in the extended-range PPDU.

\* \* \* \* \*